(12) United States Patent
Ohyama et al.

(10) Patent No.: US 6,243,575 B1
(45) Date of Patent: Jun. 5, 2001

(54) MOBILE COMMUNICATION SYSTEM, MOBILE BASE STATION, AND METHOD OF CONTROLLING THEM

(75) Inventors: Kazuya Ohyama; Takenari Takahashi, both of Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/139,781

(22) Filed: Aug. 25, 1998

(30) Foreign Application Priority Data

Feb. 13, 1998 (JP) .................................................. 10-031649

(51) Int. Cl.[7] .................................................. H04Q 7/20
(52) U.S. Cl. .............................................. 455/422; 455/524
(58) Field of Search .................................. 455/422, 524, 455/436, 456, 552, 525, 11.1

(56) References Cited

U.S. PATENT DOCUMENTS

| | | | |
|---|---|---|---|
| 5,519,761 | * | 5/1996 | Gilhousen ............................ 455/436 |
| 5,659,882 | * | 8/1997 | Fukutomi ............................ 455/524 |
| 5,867,785 | * | 2/1999 | Averbuch et al. .................... 455/524 |

FOREIGN PATENT DOCUMENTS

| | | |
|---|---|---|
| 58-63242 | 4/1983 | (JP) . |
| 62-101135 | 5/1987 | (JP) . |

* cited by examiner

*Primary Examiner*—Daniel Hunter
*Assistant Examiner*—Darnell R. Armstrong
(74) *Attorney, Agent, or Firm*—Helgott & Karas P C

(57) ABSTRACT

A mobile communication system involves a mobile space defined in, for example, a train, and mobile terminals available in the market. When the mobile terminals are used in the mobile space, the system provides them with value-added services exclusive to the mobile space. The system also includes existing base stations each controlling a fixed radio zone that covers a predetermined area, and a mobile base station for controlling a mobile radio zone allocated to the mobile space where the mobile terminals are used. The mobile base station serves as a mobile base station to communicate with the existing base stations, and as a fixed base station to communicate with the mobile terminals when the mobile terminals are in the mobile radio zone. Also provided is a method of controlling such a system.

32 Claims, 35 Drawing Sheets

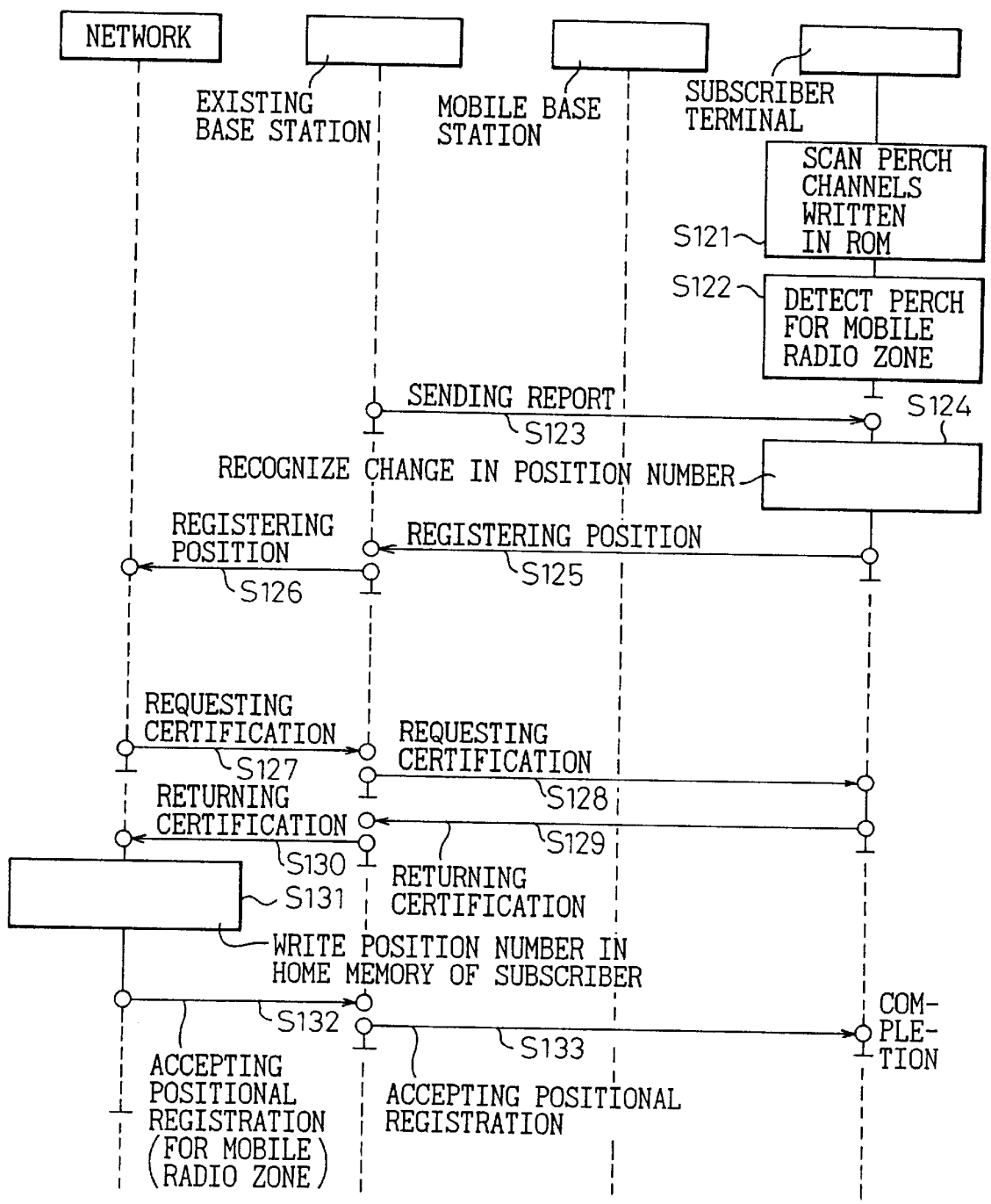

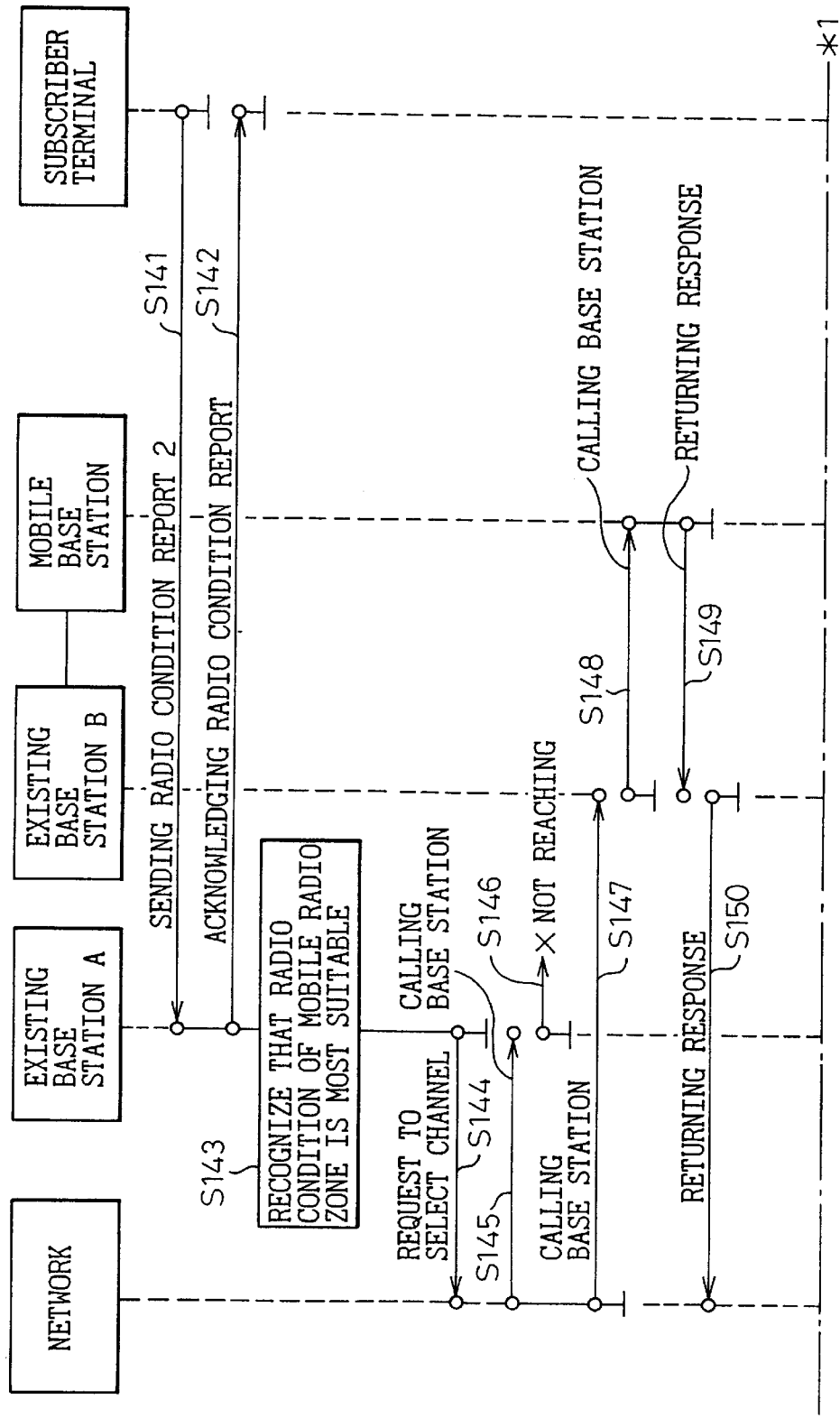

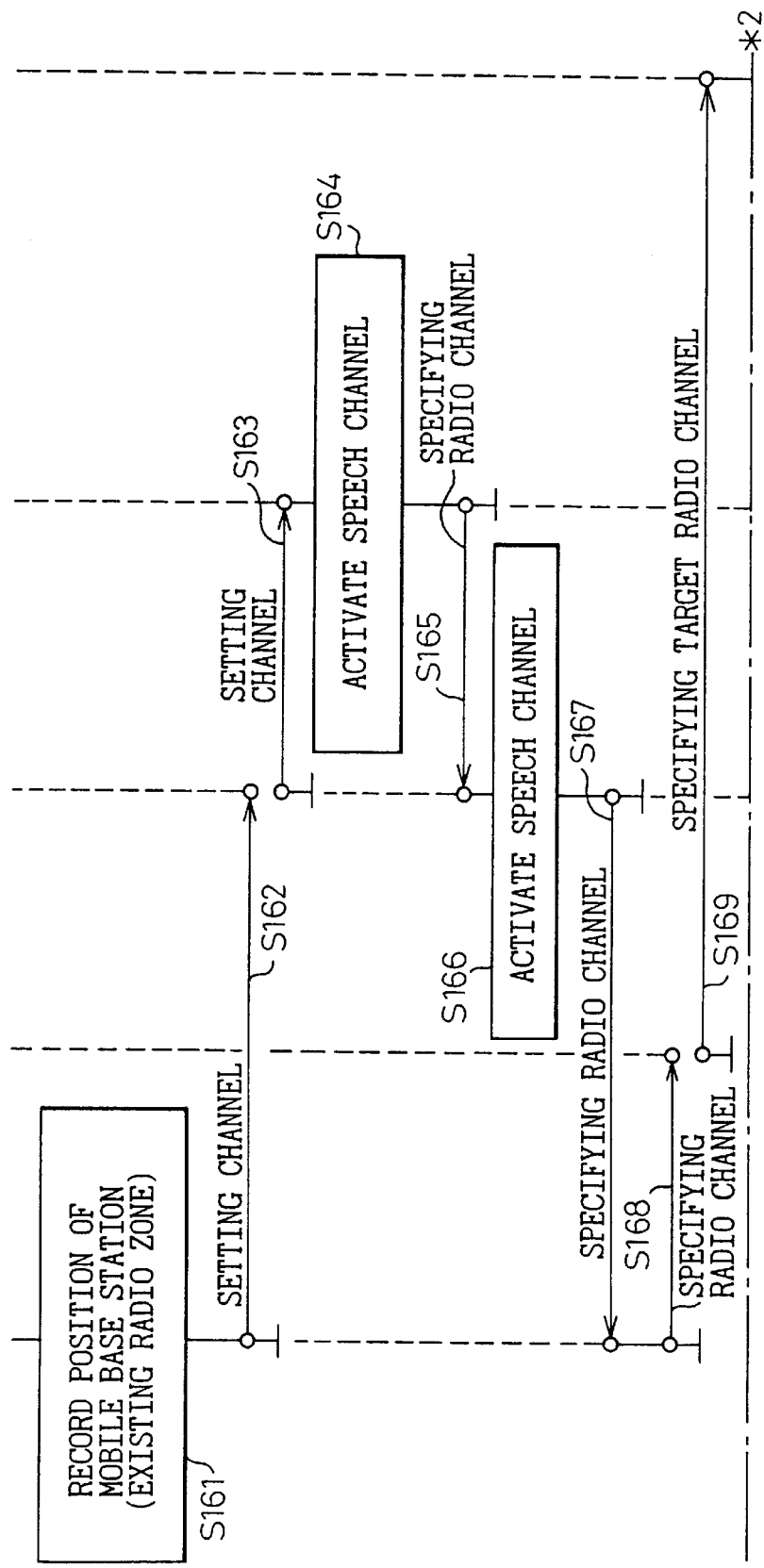

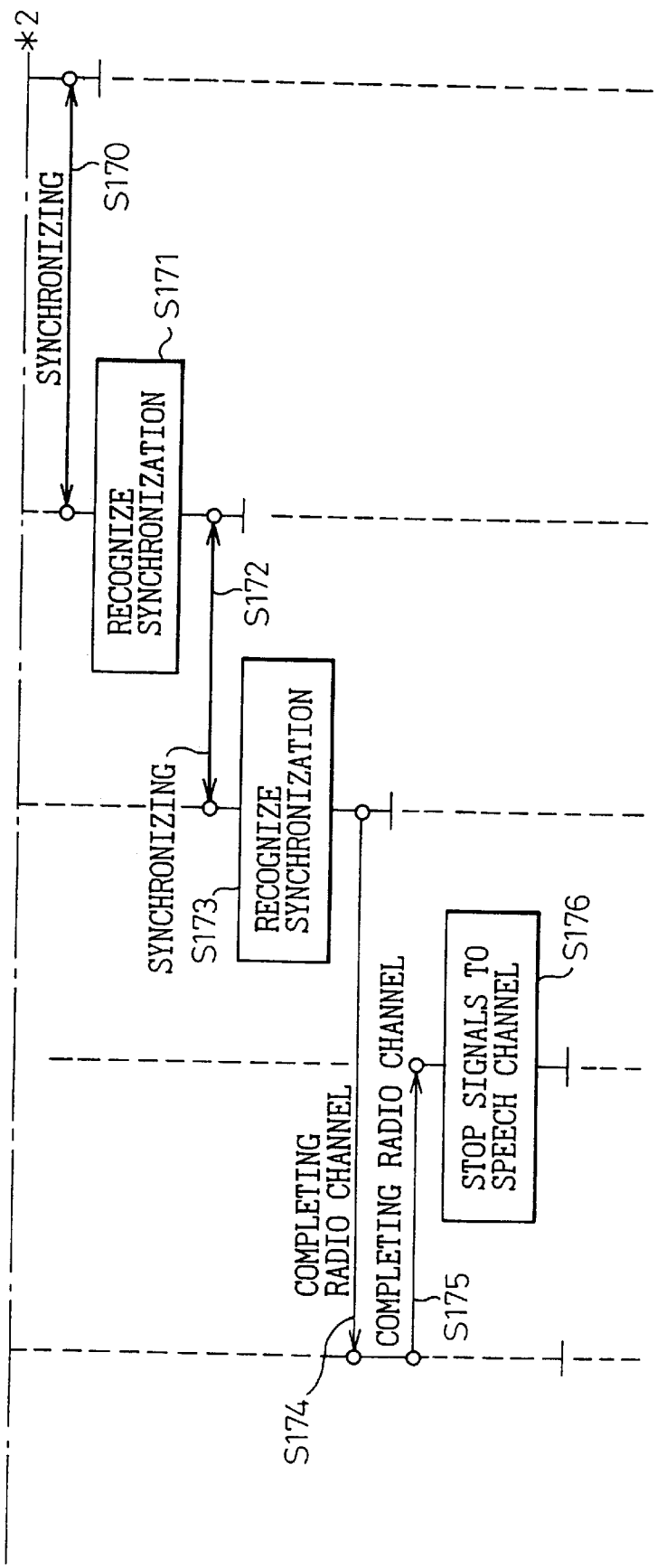

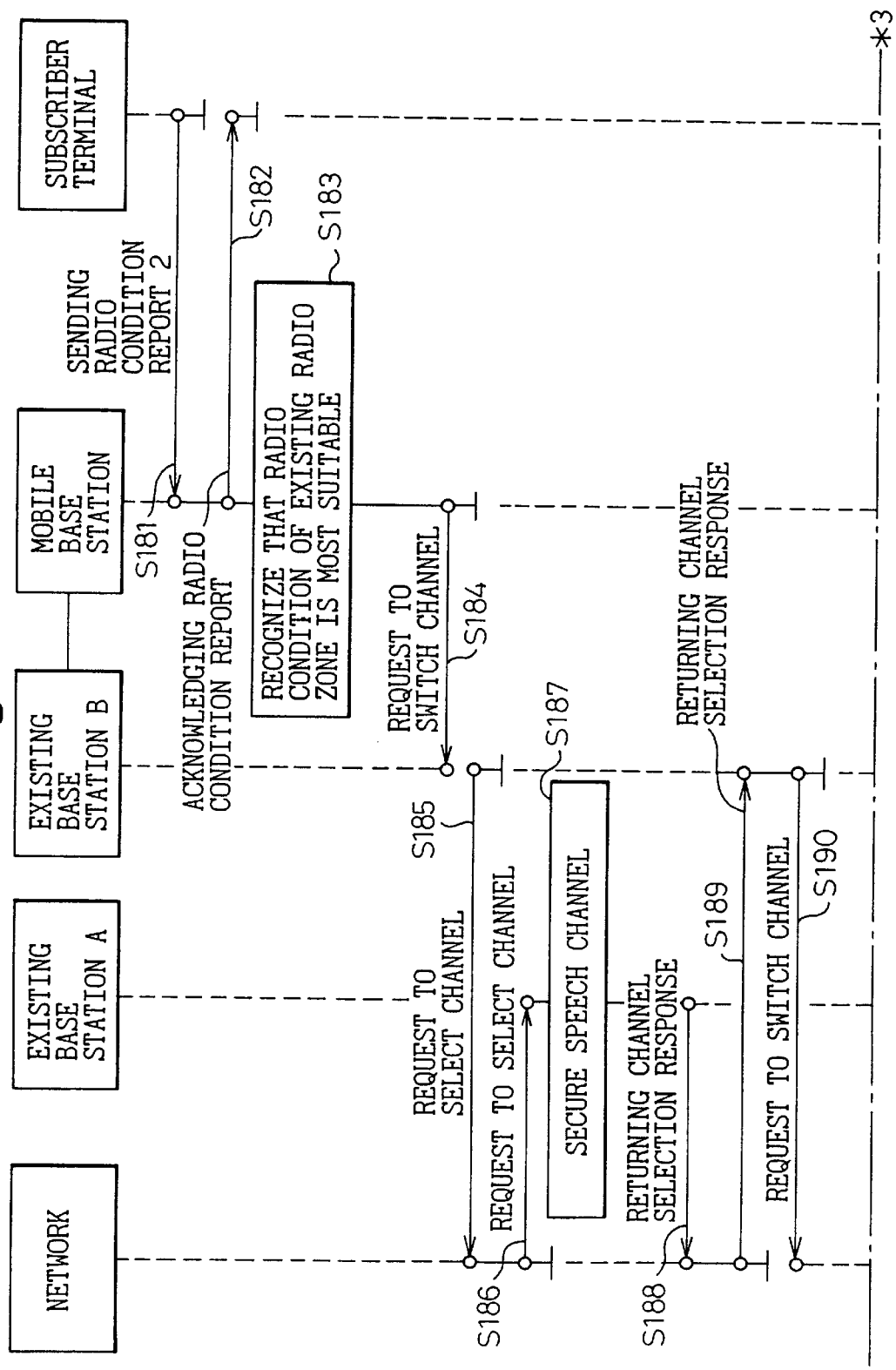

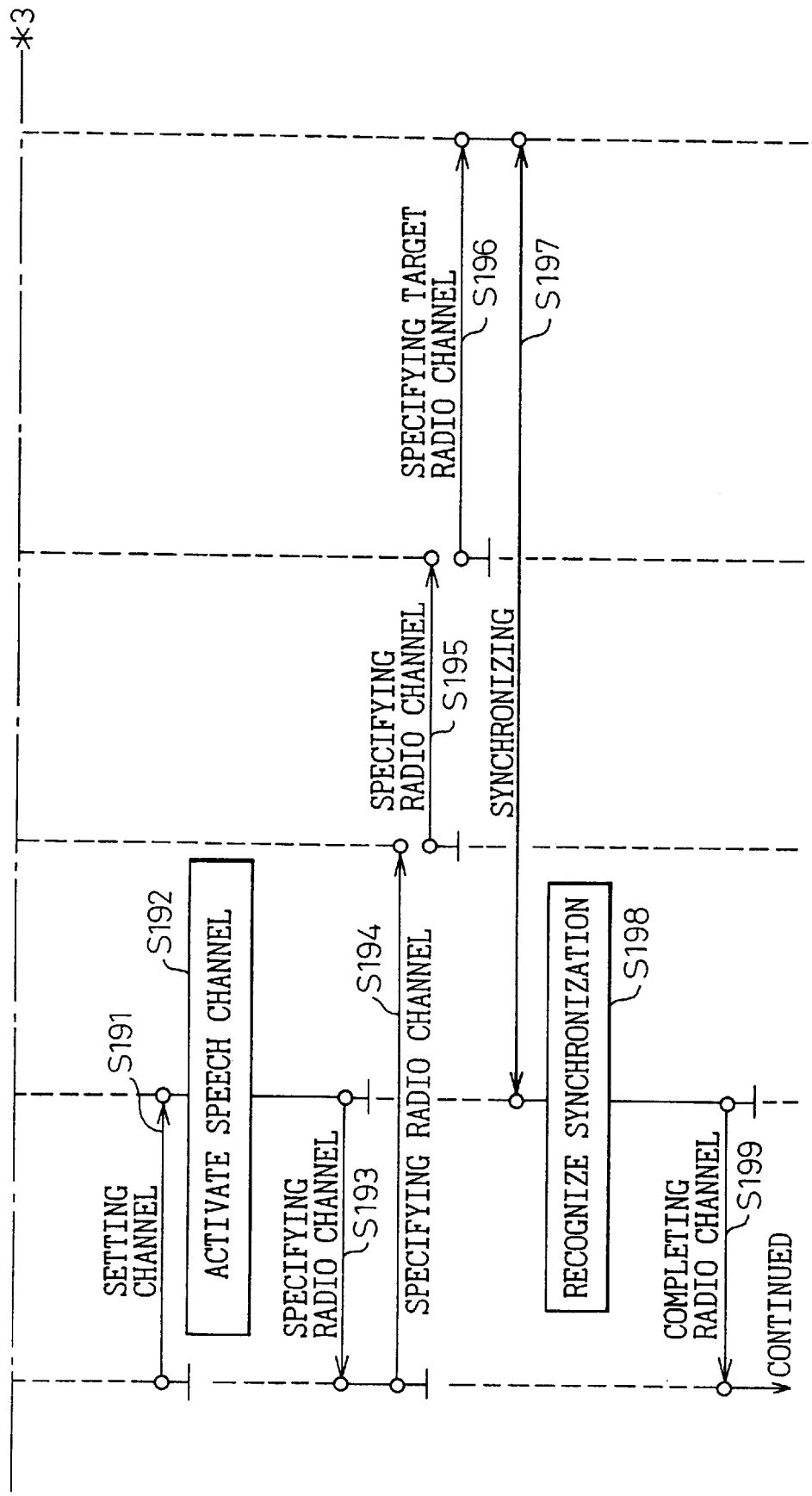

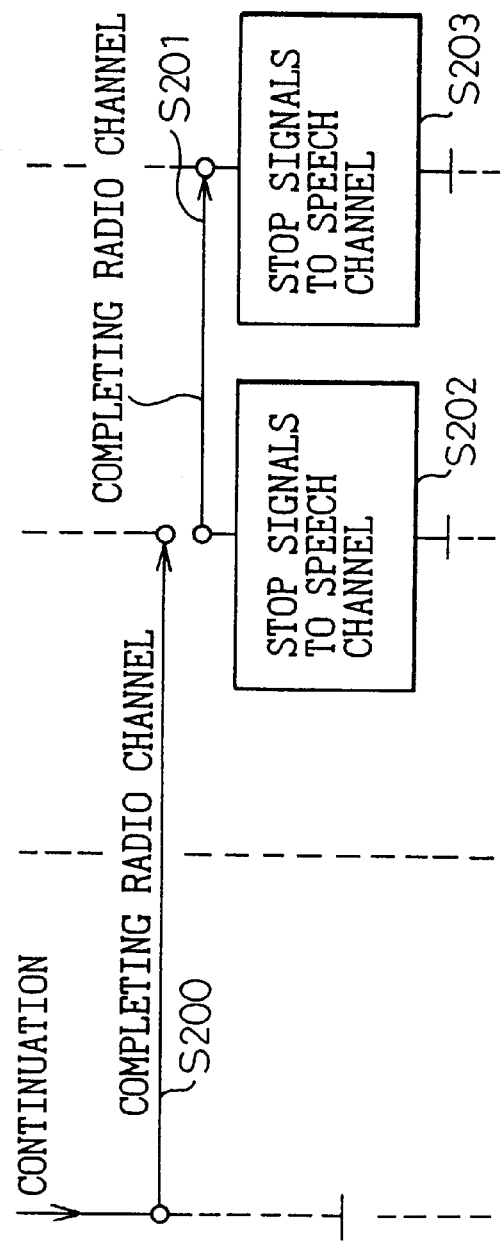

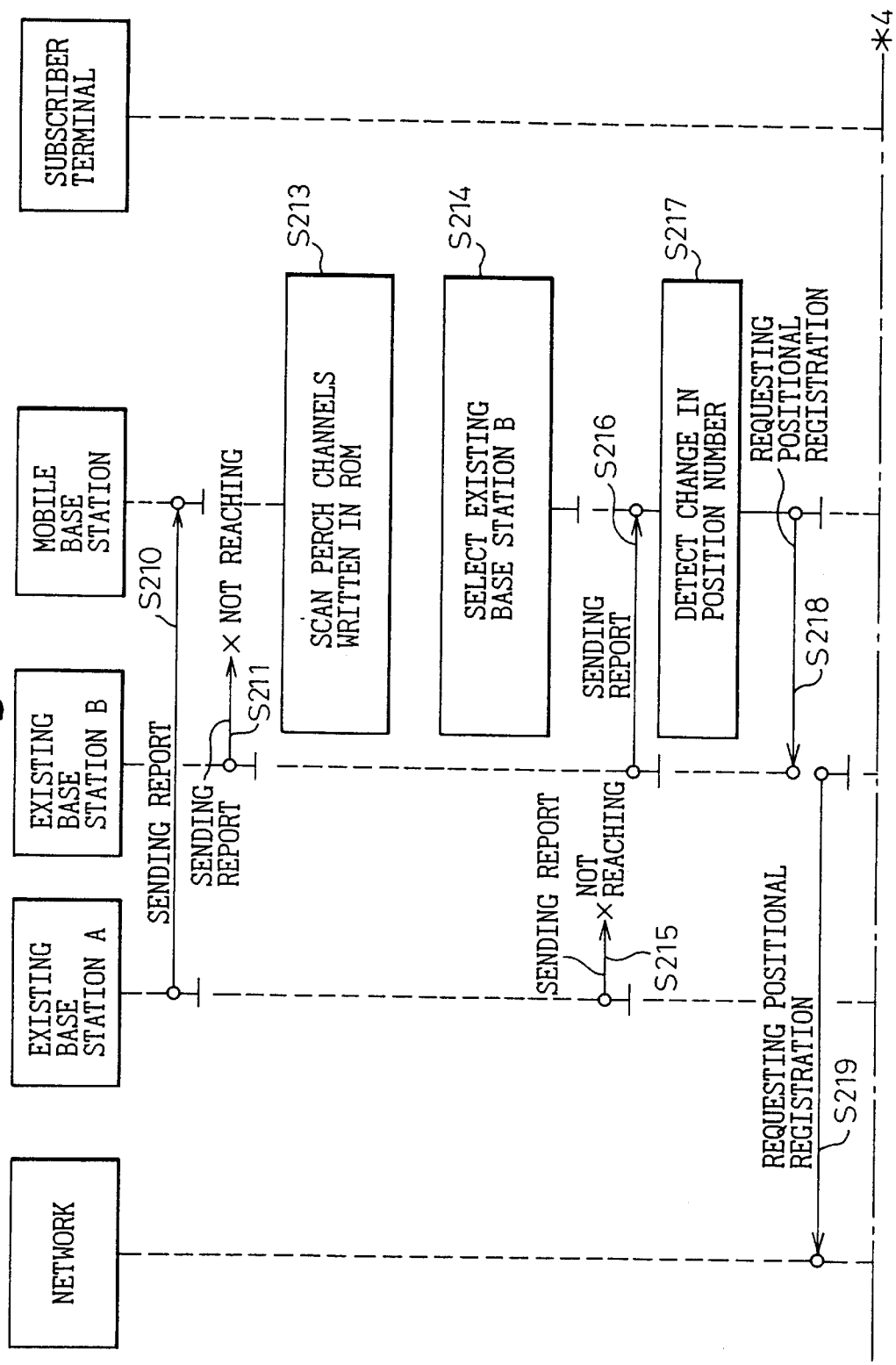

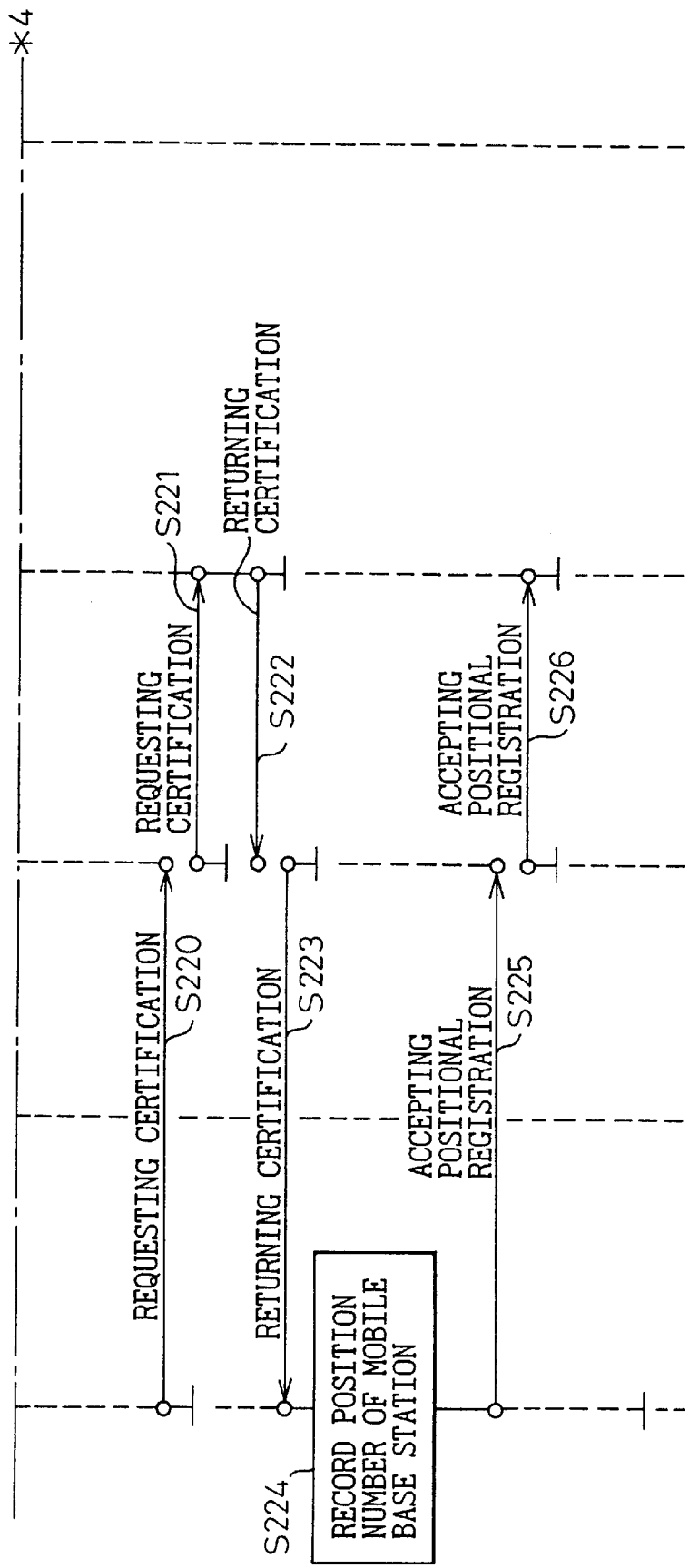

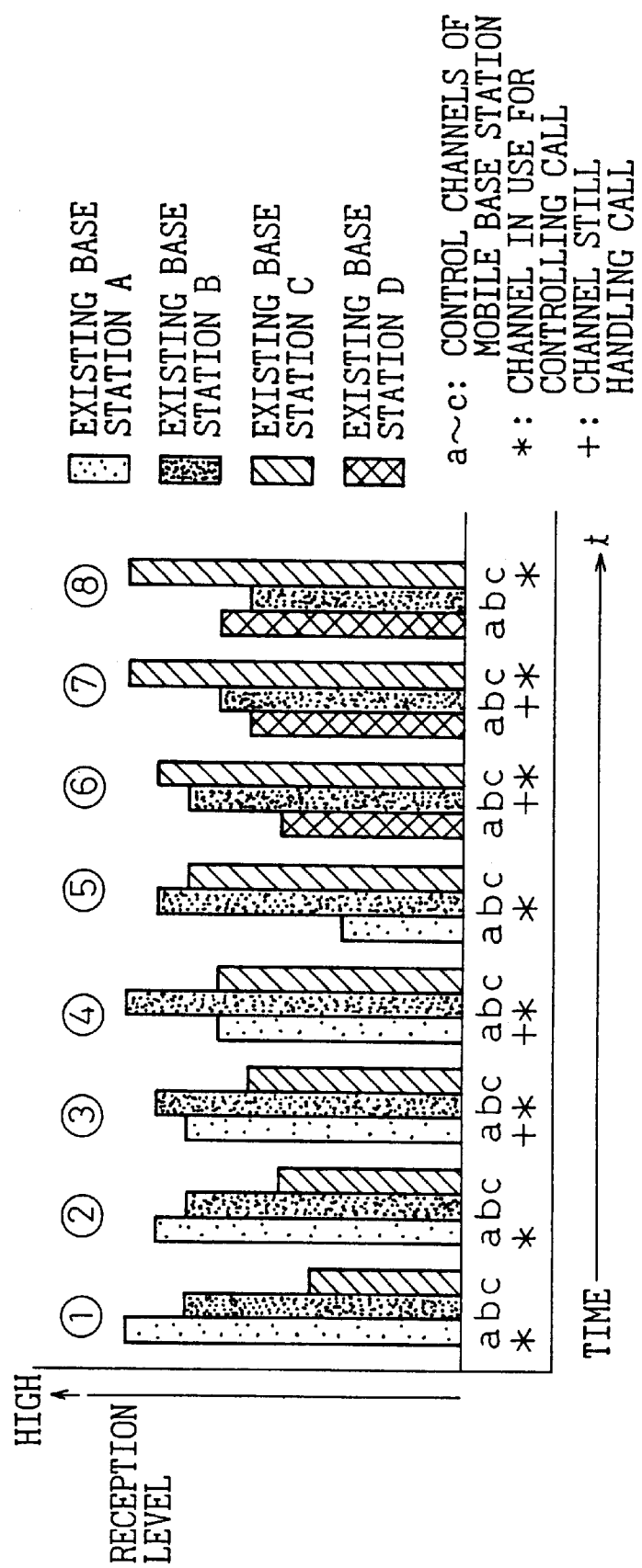

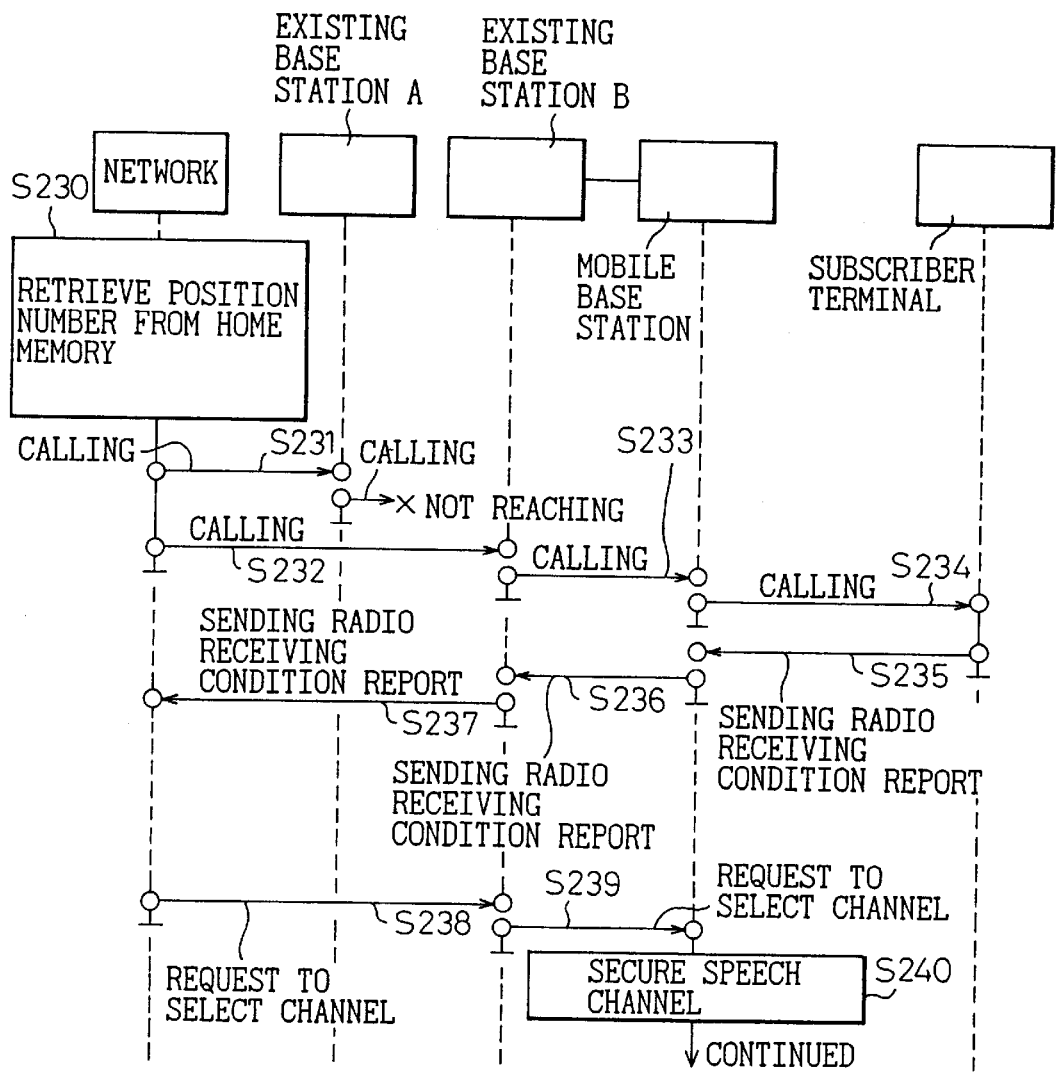

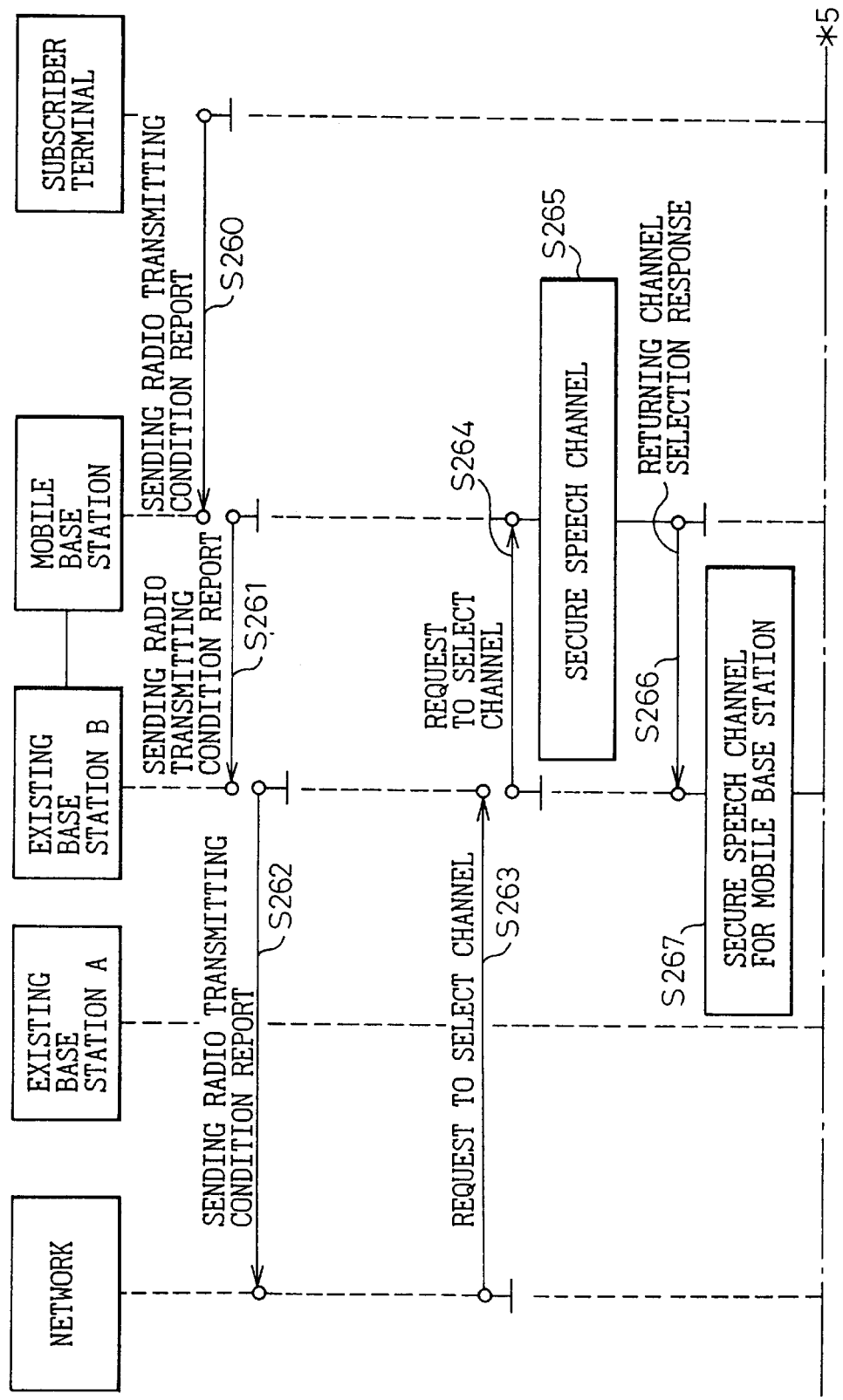

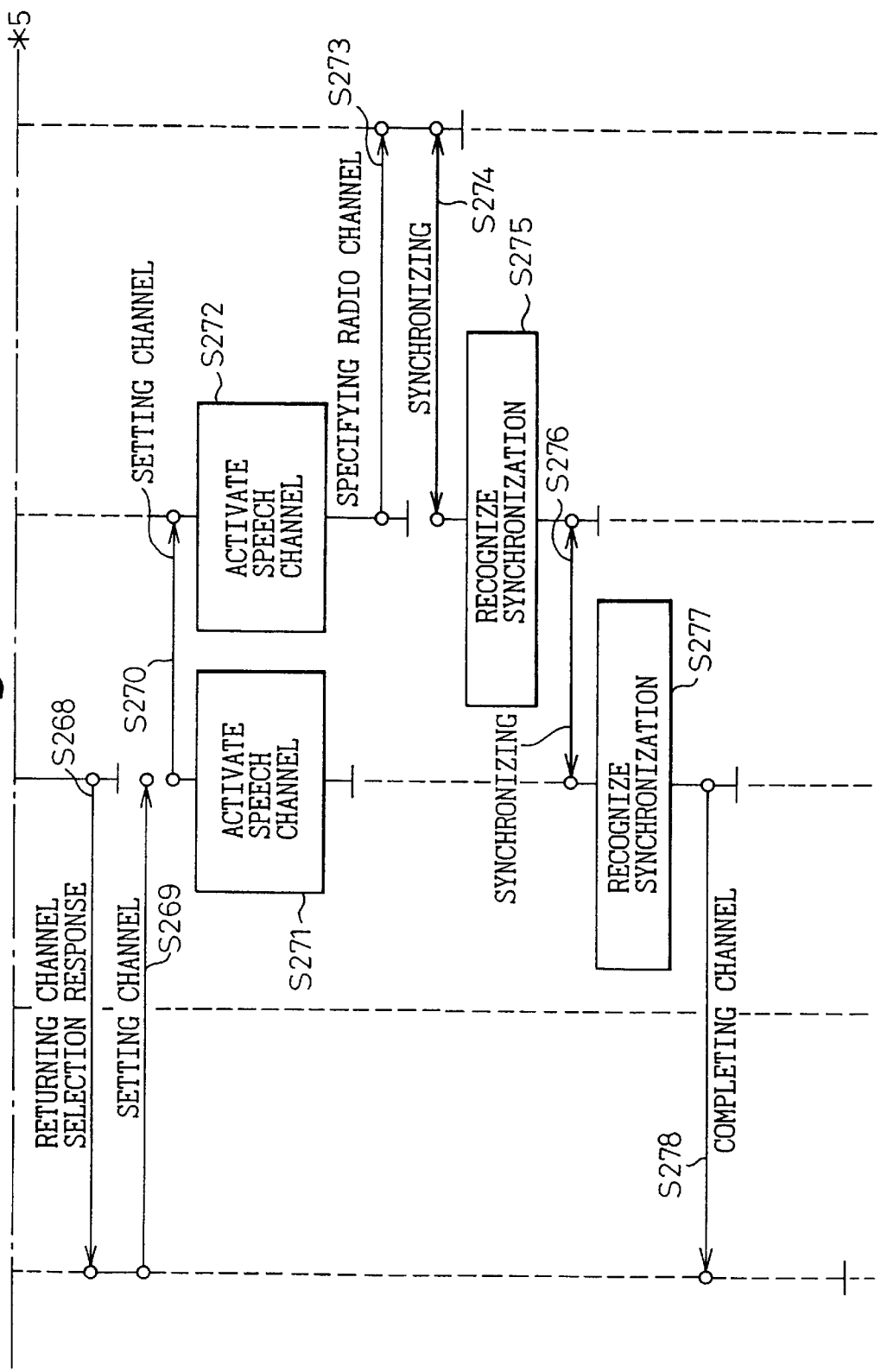

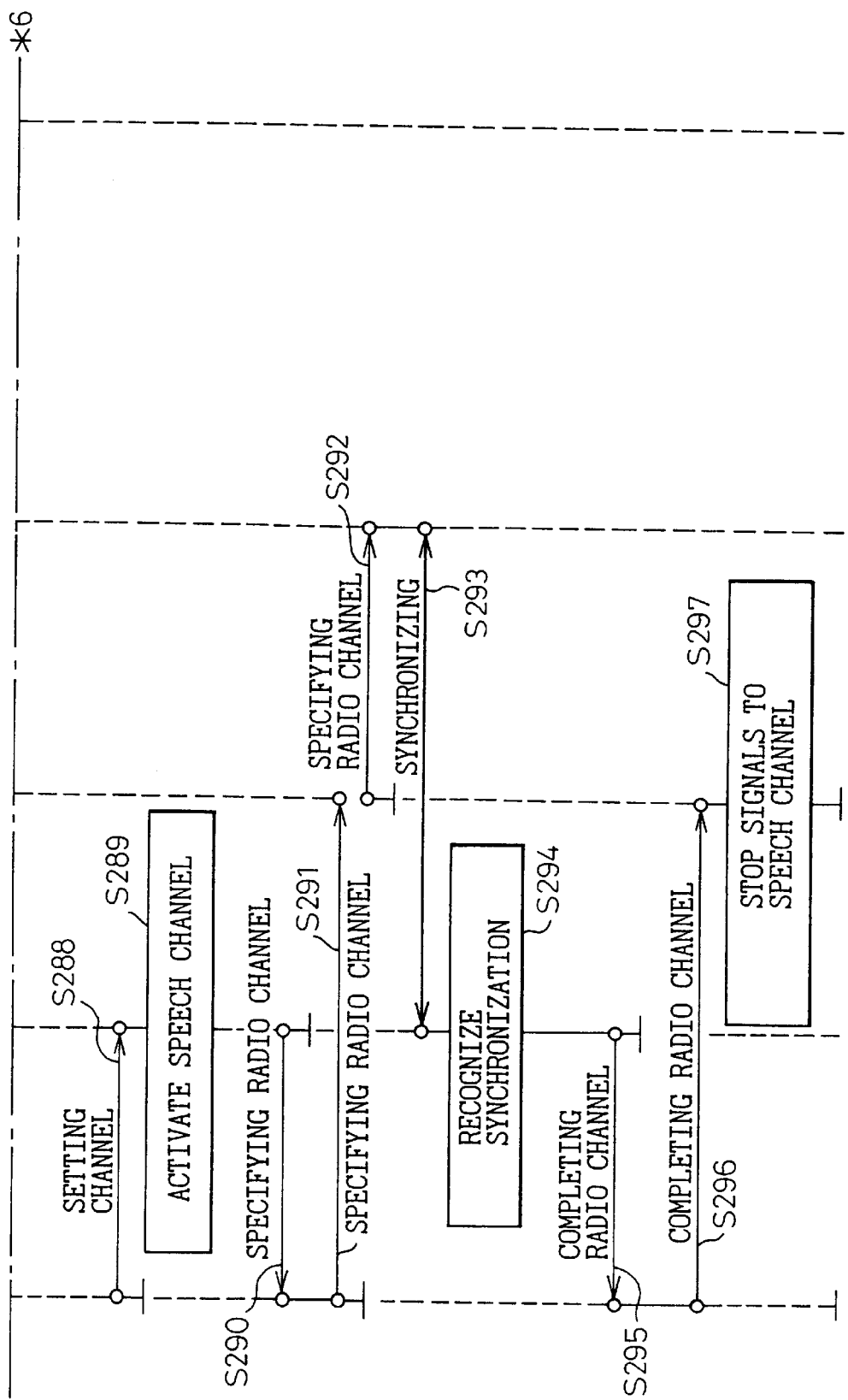

MOBILE COMMUNICATION SYSTEM, MOBILE BASE STATION, AND METHOD OF CONTROLLING THEM

BACKGROUND OF THE INVENTION

1. Field of the Invention

The present invention relates to mobile communication and, particularly, to a mobile communication system involving a mobile base station that is installed in, for example, a train to provide value-added services to mobile units such as cellular phones and pagers that are present in a mobile space formed in the train. The present invention also relates to a method of controlling such a system and such a mobile base station.

The present invention allocates a mobile radio zone to a mobile space defined in, for example, a public transport unit such as a train or a bus, and provides specific services only to mobile units that are present in the mobile radio zone.

2. Description of the Related Art

There are no prior arts that employ the concept of assigning a mobile radio zone to a mobile space so that the mobile radio zone may travel together with the mobile space. This concept is advantageous in clearly separating the inside of the mobile space from the outside thereof.

The prior arts employ fixed radio zones, which are unable to separate subscriber terminals that are present in the mobile space from those that are present outside the mobile space. The prior arts, therefore, are unable to provide exclusive services only to subscriber terminals that are present in the mobile space.

FIG. 1 shows a mobile communication system according to a prior art.

An existing base station 10 (A) has a fixed radio zone 20 (CzA) in which a mobile space 30 (B) travels. The mobile space 30 accommodates mobile subscriber terminals 40 and 41 (a, b). A mobile subscriber terminal 42 (c) is inside the zone 20 but outside the mobile space 30. The existing base station 10 provides communication services to the subscriber terminals 40 to 42.

The existing base station 10 directly controls the subscriber terminals 40 to 42 with regard to their call and speech signals and, therefore, cannot know whether the subscriber terminal 40 is inside or outside the mobile space 30. The existing base station 10 simply provides the same services to all of the subscriber terminals 40 to 42 without discriminating the subscriber terminals 40 and 41 that are inside the mobile space 30 from the subscriber terminal 42 that is outside the same.

If the mobile space 30 wants to provide the inside thereof with specific services such as arrival time notification, the mobile space 30 must have devices to display the information, or passengers in the mobile space 30 must have special receivers to receive the information. Such display devices involve costs, which may be absorbed by displaying corporate advertisements thereon. The costs of such special receivers, however, must impose a burden on passengers.

Instead of the special receivers, the existing base station 10 may employ standard subscriber terminals to use special dial services. The mobile space 30, however, travels along a route where there are radio blocking objects such as high buildings and tunnels. It is impossible for the existing base station 10 to secure stable communication for the subscriber terminals in the mobile space 30 that travels along such a radio blocking route.

When the mobile space 30 moves from the zone 20 to the next zone 21 at a high speed, channel switching and position registering processes simultaneously occur between the existing base stations and the subscriber terminals in the mobile space 30, to maintain communication between them. This may temporarily congest a network that connects the existing base stations to one another. At the same time, each subscriber terminal must scan perch channels to exhaust the battery thereof.

SUMMARY OF THE INVENTION

An object of the present invention is to assign at least one mobile radio zone to a mobile space such as a train or a bus so that the mobile radio zone may travel with the mobile space. The mobile radio zone clearly separates the inside of the mobile space from the outside thereof and provides subscriber terminals that are present in the mobile radio zone with exclusive services.

In order to accomplish the object, the present invention provides a mobile communication system including existing base stations each for controlling a fixed radio zone that covers a predetermined area, a mobile base station for controlling at least one mobile radio zone assigned to a mobile space, and mobile subscriber terminals.

The mobile base station has a first communication unit for communicating with the existing base stations, a second communication unit for communicating with the subscriber terminals, and a control unit for controlling path connection between the first and second communication units.

The first communication unit connects and switches channels to the existing base stations, independently of the second communication unit. The first communication unit holds control channels to the existing base stations and scans perches sequentially for released ones of the control channels.

The second communication unit connects and switches channels to the subscriber terminals, independently of the first communication unit. The number of mobile radio zones controlled by the second communication unit is at least one, and the second communication unit communicates with subscriber terminals that are present in the mobile radio zones.

The second communication unit makes the level of signals transmitted thereby higher than the level of signals received thereby from the existing base stations.

The mobile base station further has a service unit for providing specific services to subscriber terminals that are present in the mobile radio zones. The specific services may be individually provided to the mobile radio zones.

When entering into and exiting from the mobile radio zone, a subscriber terminal according to the present invention connects and switches channels if the entered or exited state continues for a predetermined time. The mobile base station may confirm the entered or exited state according to whether or not the state continues for the predetermined time. The existing base stations may confirm the entered or exited state according to whether or not the state continues for the predetermined time.

BRIEF DESCRIPTION OF THE DRAWINGS

The present invention will be more clearly understood from the description as set forth below with reference to the accompanying drawings, in which:

FIG. 7 shows an operation of a subscriber terminal that is in a waiting state and moves from a mobile radio zone into an existing radio zone, according to the present invention;

FIGS. 10A, 10B and 11A, 11B show an operation of a subscriber terminal that is in a talking state and moves from an existing radio zone into a mobile radio zone, according to the present invention;

FIGS. 12A, 12B and 13 show an operation of a subscriber terminal that is in a talking state and moves from a mobile radio zone into an existing radio zone, according to the present invention;

FIGS. 14A, 14B show a position registering operation of a mobile base station, according to the present invention;

FIG. 15 shows a control channel switching operation according to the present invention;

FIGS. 16 and 17 show an operation of handling an incoming call to a subscriber terminal that is present in a mobile radio zone, according to the present invention;

FIGS. 18A, 18B show an operation of handling an outgoing call from a subscriber terminal that is present in a mobile radio zone, according to the present invention;

FIGS. 19A, 19B show a channel switching operation of a mobile base station between existing base stations, according to the present invention;

DESCRIPTION OF THE PREFERRED EMBODIMENTS

Figure 1:
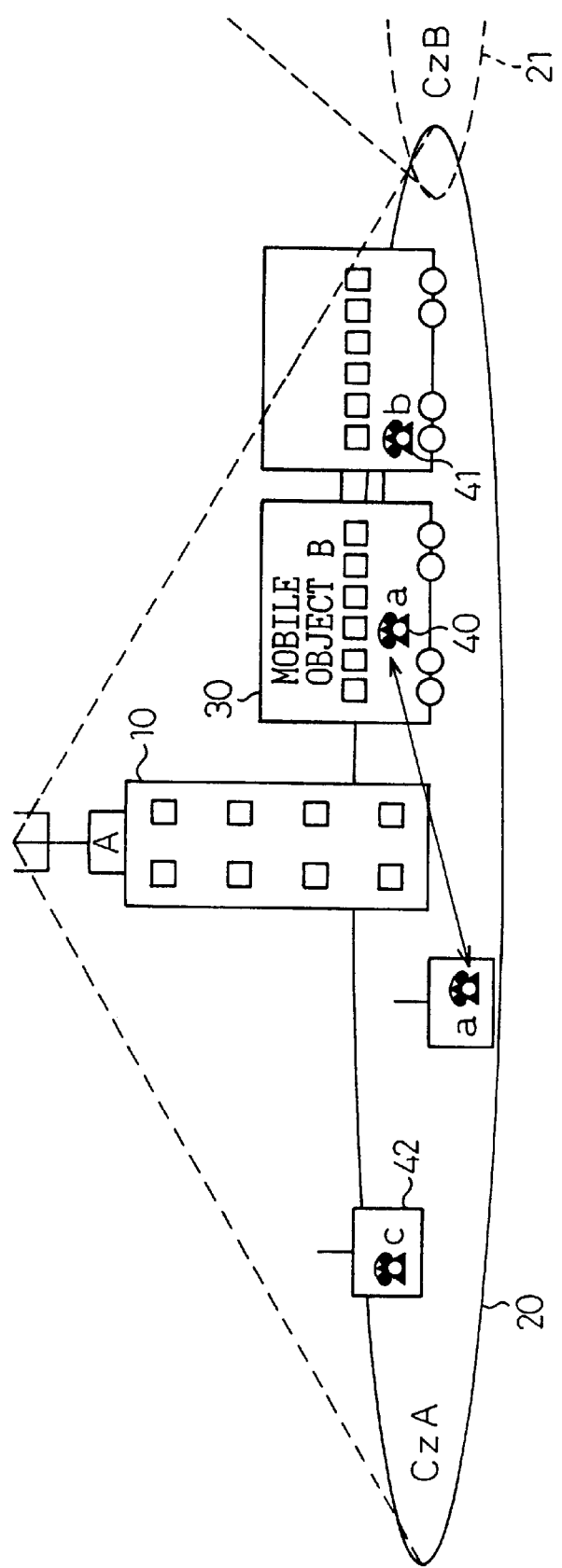
FIG. 1 shows a mobile communication system according to a prior art.
Figure 2:
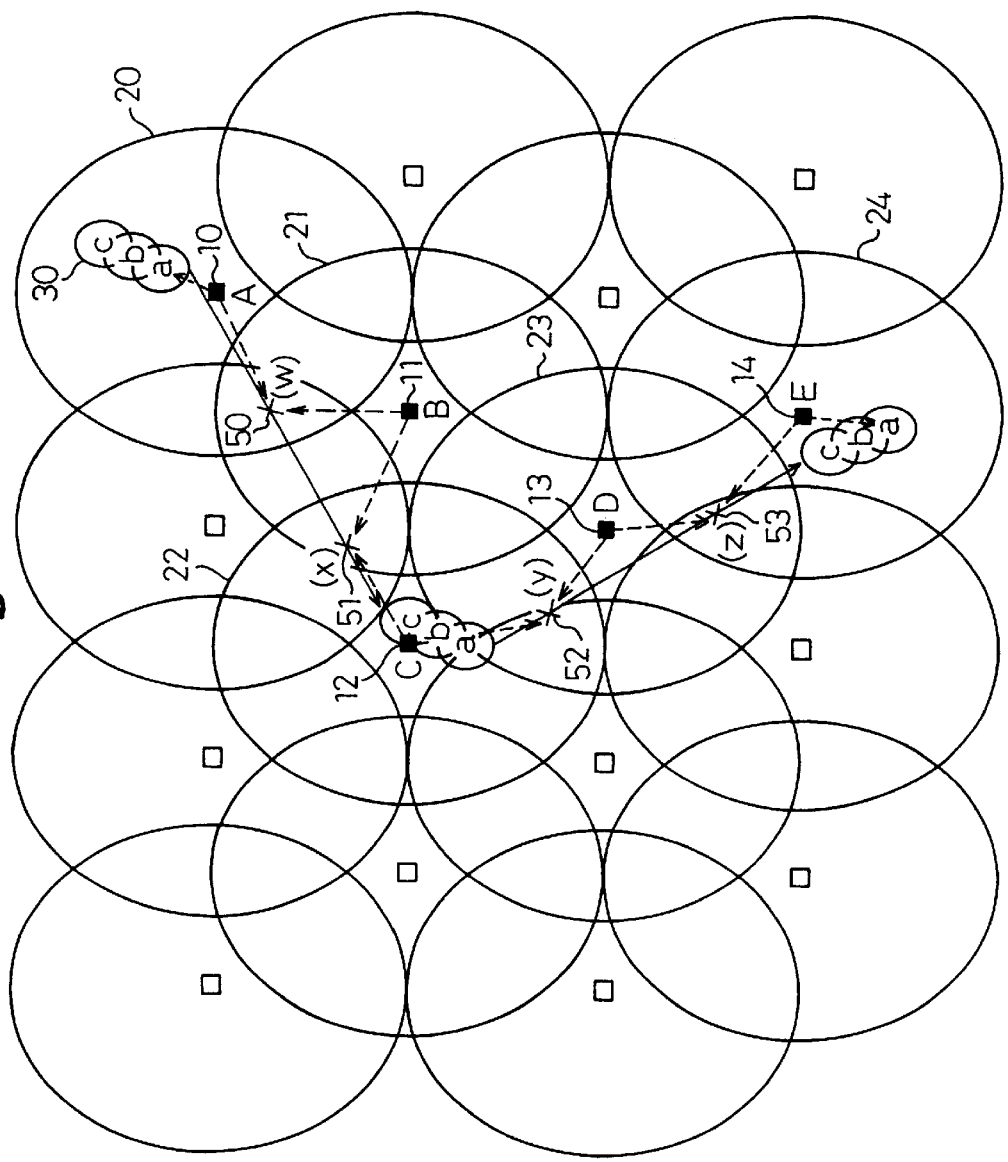
FIG. 2 shows communication between existing base stations and a mobile base station according to the present invention.

FIG. 2 shows communication between existing base stations and a mobile base station according to the present invention.

A mobile space 30 travels within a mobile communication service area. The mobile space 30 is, for example, a train consisting of cars a, b, and c. A mobile radio zone is assigned to each of the cars. The mobile space 30 travels from a fixed existing radio zone 20 (A) to a fixed existing radio zone 24 (E).

The mobile space 30 has a mobile base station for controlling the mobile radio zones to communicate with mobile subscriber terminals that are present in the mobile radio zones and provide exclusive services thereto. The mobile base station communicates with the existing base stations and carries out communication operations such as channel switching and position registering.

For the sake of simplicity of explanation, the mobile space 30 is referred to as the mobile base station 30 in the following description. The mobile base station 30 starts from the existing radio zone 20 controlled by an existing base station 10 (A). Namely, the mobile base station 30 holds perch channels of the existing base station 10 to secure speech channels to the existing base station 10 if there are calls. When the mobile base station 30 starts to move toward an existing radio zone 22 controlled by an existing base station 11, a communication condition with the existing base station 11 gradually improves from a point 50 (w) where the existing radio zones 20 and 21 overlap.

The mobile base station 30 scans perch channels and switches the existing base station 10 to the existing base station 11 that secures the best communication condition at the moment. If there are conversations in progress at this moment, the mobile base station 30 switches speech channels for the conversations. The similar switching operation is carried out at each of points 51 to 53 (x to z), and the mobile base station 30 arrives at a destination in the existing radio zone 24.

Figure 3:
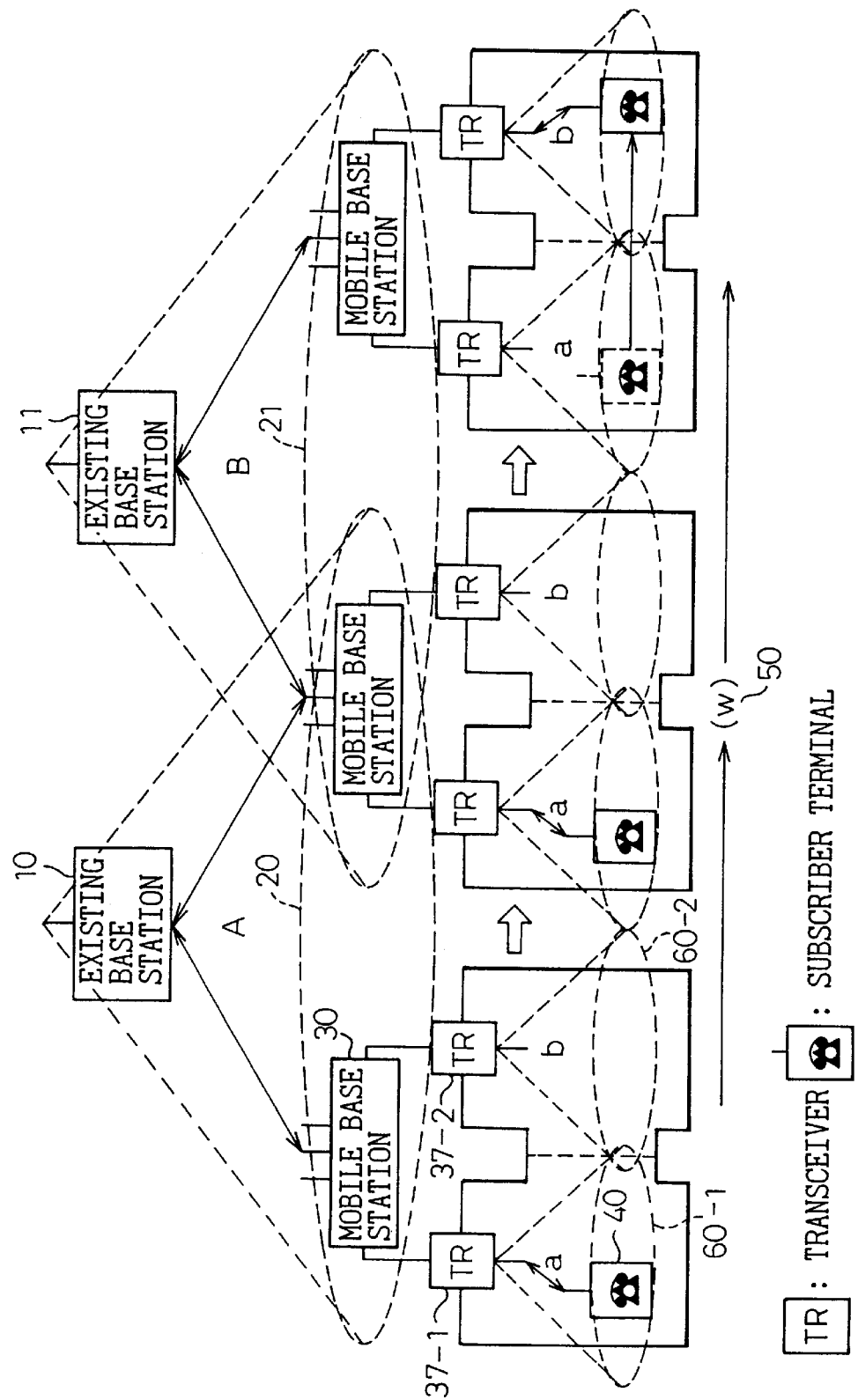
FIGS. 3 and 4 show speech channel switching control among existing base stations, a mobile base station, and subscriber terminals according to the present invention.

FIG. 3 shows speech channel switching control among the existing base stations, mobile base station, and subscriber terminals.

The mobile base station 30 travels from the existing radio zone 20 toward the existing radio zone 21 while switching speech channels.

The mobile base station 30 controls one or more mobile radio zones 60-1 and 60-2, which involve transceivers 37-1 and 37-2, respectively, to radio-communicate with subscriber terminals that are present in the mobile radio zones. The mobile radio zones 60-1 and 60-2 correspond to the cars a and b of FIG. 2, respectively. A subscriber terminal 40 is in the mobile radio zone 60-1 at first, and moves to the mobile radio zone 60-2.

As will be explained later with reference to FIG. 9, the transceivers 37-1 and 37-2 control the level of radio transmission signals to be higher than the level of signals received from the existing base stations by a predetermined value. This is to control the level of perches among the subscriber terminal 40, mobile base station 30, and existing base stations 10 and 11 in such a way as to give priority to connection between the subscriber terminal 40 and the transceiver 37-1 or 37-2. This level controlling of the present invention enables subscriber terminals available in the market to be used in mobile objects to receive exclusive services.

Communication between the existing base stations 10 and 11 and the mobile base station 30 is carried out as explained with reference to FIG. 2. Communication channels are switched from those of the existing base station 10 to those of the existing base station 11 at around the point 50 where the existing radio zones 20 and 21 overlap. According to the present invention, connection between the mobile base station 30 and the subscriber terminal 40 that is in the mobile radio zone 60-1 is unchanged at the point 50 to maintain communication.

If the subscriber terminal 40 moves from the mobile radio zone 60-1 into the mobile radio zone 60-2, the quality of connection with the transceiver 37-1 deteriorates, and that with the transceiver 37-2 improves. Consequently, the mobile base station 30 switches the connection of the subscriber terminal 40 from the transceiver 37-1 to the transceiver 37-2.

Figure 4:
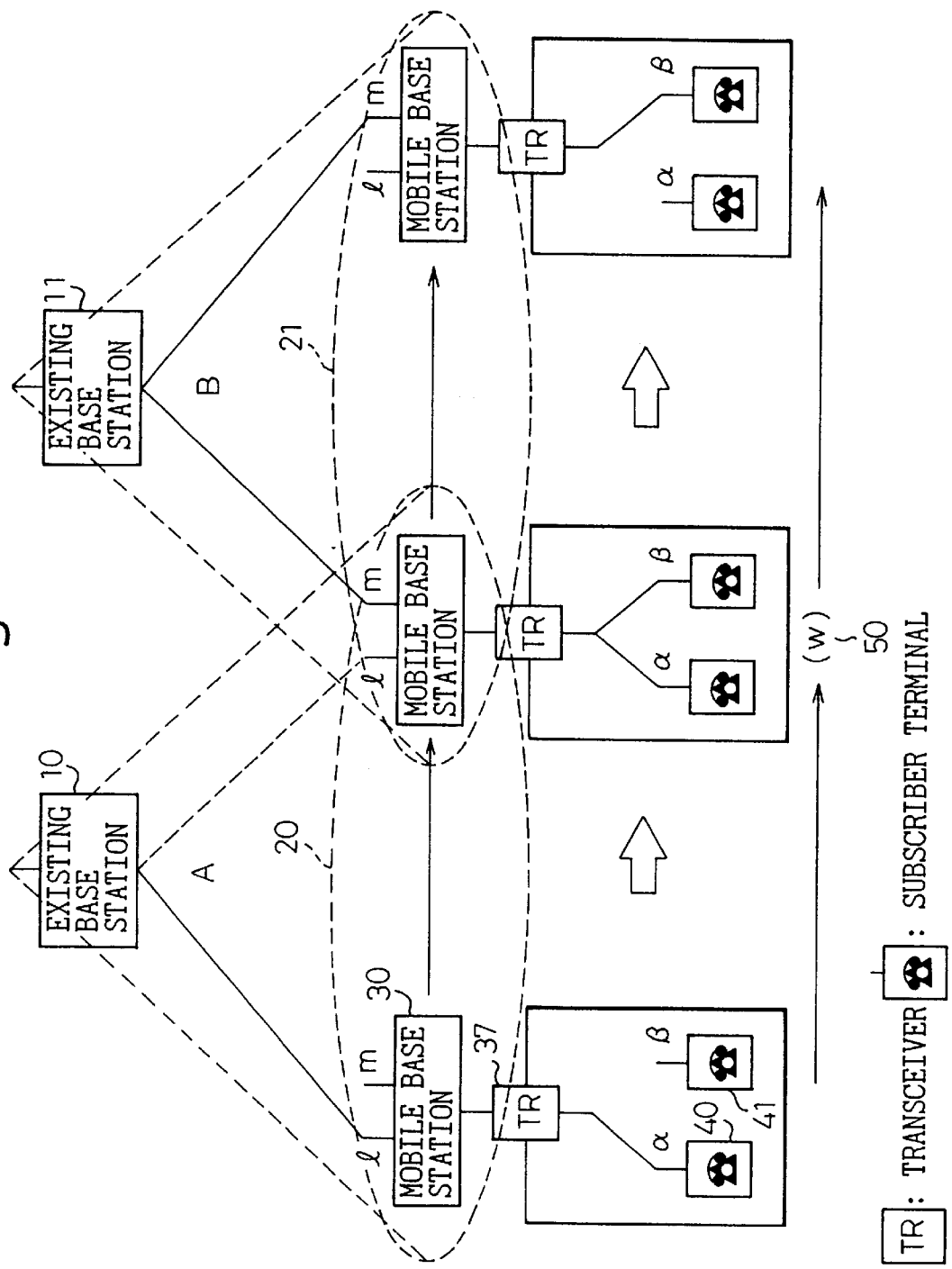

FIG. 4 shows speech channel switching control among the existing base stations, mobile base station, and subscriber terminals.

The mobile base station 30 travels from the existing radio zone 20 toward the existing radio zone 21, and control channels are switched from one to another.

The mobile base station 30 is connected to the existing base station 10 through a control channel 1. Under the control of the mobile base station 30, the subscriber terminal 40 is making a call through the control channel 1. As the mobile base station 30 approaches the point 50, the quality of connection with the existing base station 10 deteriorates, and that with the existing base station 11 improves.

The mobile base station 30 maintains the call of the subscriber terminal 40 until it completes. If a subscriber terminal 41 makes a new call, the mobile base station 30 handles the new call with the existing base station 11 through a control channel m. Soon, the call of the subscriber terminal 40 completes, while the call of the subscriber terminal 41 continues. The control channel l through which the call of the subscriber terminal 40 has been completed scans perches to make itself prepared for the quality deterioration of the control channel m.

According to the present invention, the mobile base station 30 serves literally as a mobile base station with respect to the existing base stations 10 and 11 through the control channels l and m. On the other hand, the mobile base station 30 serves as a fixed base station with respect to the subscriber terminals 40 and 41. In this way, the present invention is capable of clearly separating hierarchically higher stations from lower stations by using the mobile base station 30 as a boundary.

The mobile base station 30 is capable of providing the subscriber terminals 40 and 41, which may be those available in the market, with exclusive services that are limited in the train. The exclusive services include making a conversation between the subscriber terminals in the train, rejecting incoming calls to the subscriber terminals, ordering something from a cafeteria in the train, and getting information about the next stop of the train. Naturally, the subscriber terminals can start outside calls or receive incoming calls through the mobile base station 30.

The exclusive services to be provided in the train involve no radio blocking areas, and therefore, are of high quality. Even when the mobile base station 30 moves from one existing radio zone to another, the exclusive services are not influenced by such movement, and therefore, no simultaneous channel switching and position registering occur. As a result, no temporary congestion occurs in a network that controls the existing and mobile base stations, and the subscriber terminals are not required to scan perches to exhaust batteries.

Figure 5:
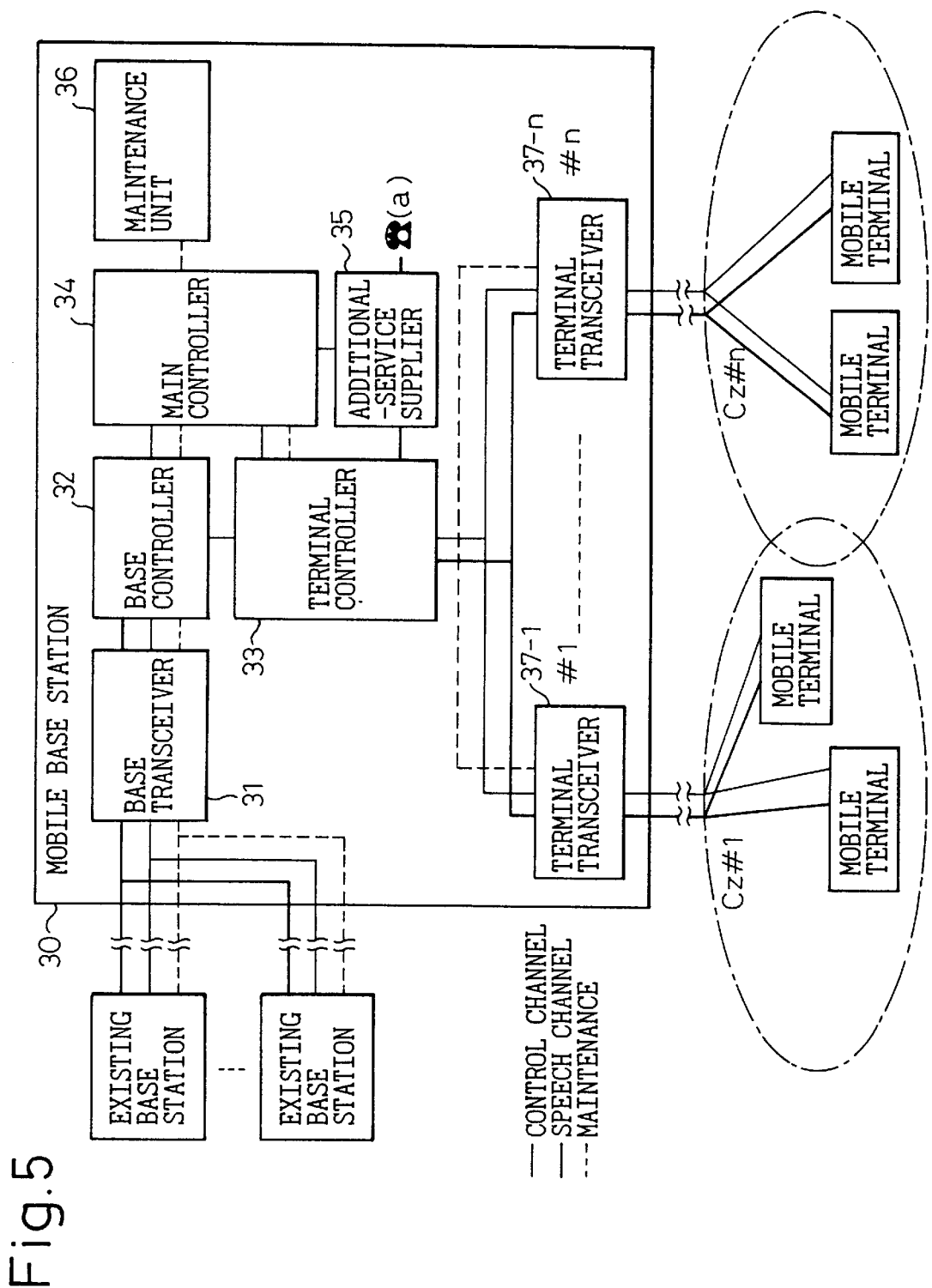
FIG. 5 shows a basic arrangement of a mobile base station according to the present invention.

FIG. 5 shows a basic arrangement of the mobile base station 30 according to the present invention.

A base transceiver 31 communicates with the existing base stations. A base controller 32 controls the base transceiver 31, secures channels for the base transceiver 31, and scans perches in existing radio zones around it.

Terminal transceivers 37-1 to 37-n communicate with subscriber terminals that are present in the mobile radio zones controlled by the mobile base station 30. The terminal transceivers 37-1 to 37-n also control the level of radio transmission signals in the mobile radio zones as well as the level of perches of the subscriber terminals. A terminal controller 33 controls the terminal transceivers 37-1 to 37-n and switches speech and control channels between the mobile radio zones.

A main controller 34 controls the base controller 32 and terminal controller 33 and selects channels between them. An additional-service supplier 35 supplies services that are specific to the mobile base station 30. The additional services include special dial services individually provided for the mobile radio zones and a service for prohibiting incoming calls. A maintenance unit 36 is used to maintain the mobile base station 30 as a whole and has a man-machine interface such as a personal computer.

FIGS. 6 to 29 show communication controlling sequences among the network, existing base stations, mobile base station, and subscriber terminals of FIGS. 2 to 5, according to embodiments of the present invention.

The controlling sequences of FIGS. 6 to 29 are classified into the below-mentioned seven cases, which will be explained one by one. The details of each of the communication control sequences follow standards stipulated in, for example, RCR-27E (NTT) Recommendations. The seven cases are:

(1) handling subscriber terminal when it moves between existing radio zone and mobile radio zone;

(2) registering position and selecting control channels for mobile base station;

(3) handling incoming call to subscriber terminal in mobile radio zone;

(4) handling outgoing call from subscriber terminal in mobile radio zone;

(5) switching channels for call of subscriber terminal in mobile radio zone;

(6) cutting call of subscriber terminal in mobile radio zone; and (7) providing exclusive services in mobile radio zone (1) Handling subscriber terminal when it moves between existing radio zone and mobile radio zone A mobile subscriber terminal that moves between an existing radio zone and a mobile radio zone is in a waiting or talking state. This will be explained.

1) Waiting State

Figure 6:
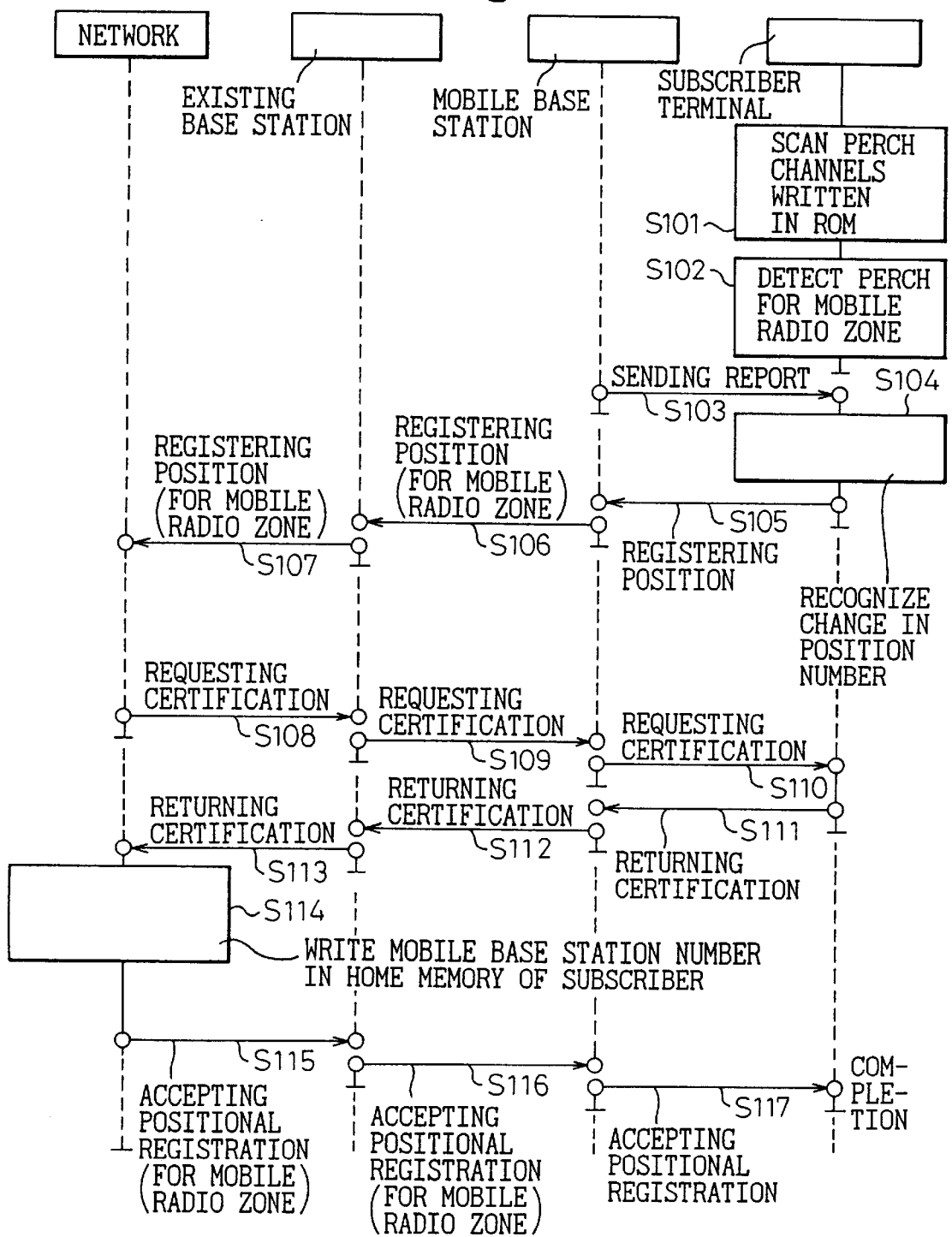
FIG. 6 shows an operation of a subscriber terminal that is in a waiting state and moves from an existing radio zone into a mobile radio zone, according to the present invention.

FIGS. 6 and 7 show the operation of a mobile subscriber terminal of waiting state moving between an existing radio zone and a mobile radio zone.

In FIG. 6, the subscriber terminal in a waiting state moves from an existing radio zone into a mobile radio zone. The subscriber terminal receives a report having a higher signal level from the mobile base station that controls the mobile radio zone and detects a perch channel of the mobile radio zone in steps S101 to S103. The report includes data about the mobile base station and the position thereof.

After recognizing a change in a position number in the report, the subscriber terminal transmits position registering data including a machine number in step S105. The mobile base station receives the position registering data and transmits it with a mobile base station number to the existing base station that controls the mobile base station in step S106.

The existing base station transmits the position registering data to the network in step S107. The network has a home memory (HLR).

Upon receiving the position registering data, the home memory writes the mobile base station number as a registered position number of the subscriber terminal in step S114. If there is a call for the subscriber terminal, the mobile base station number in the home memory is used to find the position of the subscriber terminal.

The home memory may be divided into two, one for subscriber terminals and the other for mobile base stations. It may be possible to register a mobile base station like a subscriber terminal in a single home memory. Since the present invention relates a plurality of subscriber terminals to a mobile base station, it is preferable to prepare a home memory for mobile base stations and another for subscriber terminals.

In FIG. 7, the subscriber terminal in a waiting state moves from a mobile radio zone into an existing radio zone. The subscriber terminal detects a perch channel of high level in the existing radio zone in steps S121 and S122, receives a report from the existing radio zone in step S123, and recognizes a change in a position number in step S124.

In step S125, the subscriber terminal transmits position registering data to the existing base station that controls the existing radio zone in question. The steps that follow are the same as the corresponding steps in FIG. 6. Namely, the existing base station transfers the position registering data to the network in step S126, and the network writes the position number of the existing radio zone sent from the subscriber terminal in the home memory in step S131.

It is possible that the subscriber terminal moves from a mobile radio zone into an existing radio zone and quickly returns to the mobile radio zone, that an outside subscriber terminal passes beside a mobile radio zone of a train that is stopped at a station, that a mobile radio zone passes beside an outside subscriber terminal, and that a mobile radio zone passes beside existing base stations. In any one of these possible cases, the subscriber terminal may temporarily switch the present channel to another that provides better radio waves.

If this happens, however, the subscriber terminal or mobile base station must quickly change its position registering data. This increases traffic and load on the network and hinders communication services. To avoid this, the present invention sets a predetermined lag time before sending position registering data when a subscriber terminal moves between mobile and existing radio zones to change the registered position number thereof. Only if the change lasts for the lag time, does the present invention transmit the position registering data to the network.

Figure 8A:
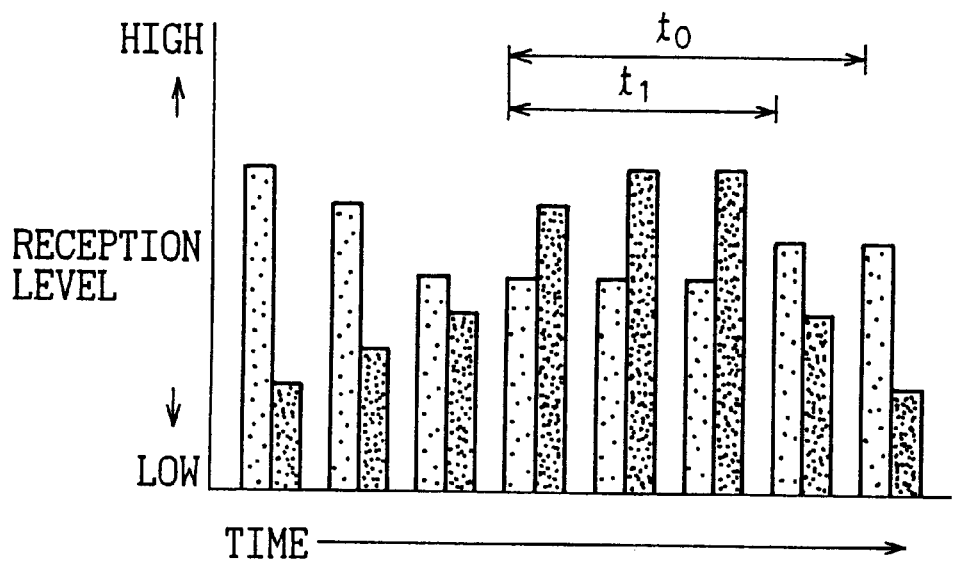
FIGS. 8A and 8B show holding and switching control according to the present invention.
Figure 8B:
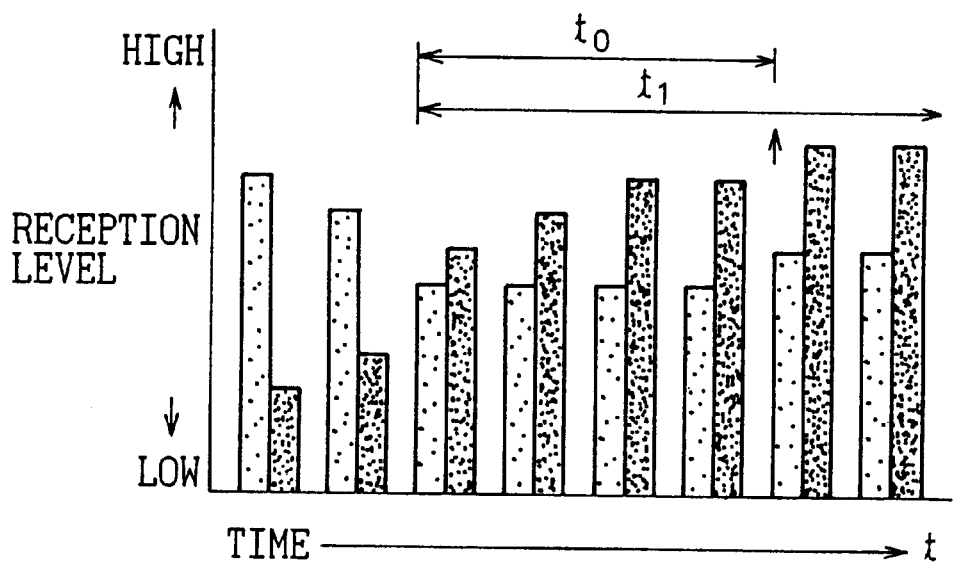

FIGS. 8A and 8B show the lag time control of the present invention.

A thinly dotted bar represents the level of signals received by a subscriber terminal from an existing base station, and a densely dotted bar represents the level of signals received by the subscriber terminal from the mobile base station. In a period t1, the level of signals received from the mobile base station is higher than that from the existing base station. A period t0 is the lag time between the detection of a change in a position number and the execution of a position number changing operation.

The case of FIG. 8A occurs when the subscriber terminal is outside the mobile base station, and the mobile base station passes beside the subscriber terminal. Since t1<t0, the subscriber terminal does not transmit position registering data. The case of FIG. 8B occurs when the subscriber terminal is on a platform where the mobile base station arrives. Since t1>t0, the subscriber terminal transmits position registering data at the timing of an upward arrow mark.

In these examples, the subscriber terminal determines whether or not the lag time has elapsed and carries out a channel switching operation. Instead, the mobile base station or existing base station may carry out the channel switching operation based on the lag time. This enables subscriber terminals available in the market to be used as they are for the present invention and reduces the traffic of the home memory of the network.

The mobile base station of the present invention maintains transmission power in the mobile radio zones higher than that in ambient existing radio zones, so that subscriber terminals in the mobile radio zones are not affected by the existing radio zones.

The mobile base station of the present invention may monitor the conditions of channels of the mobile radio zones and of the ambient existing radio zones, and make the level of signals transmitted in the mobile radio zones always higher than that in the existing radio zones by a predetermined value.

Figure 9A:
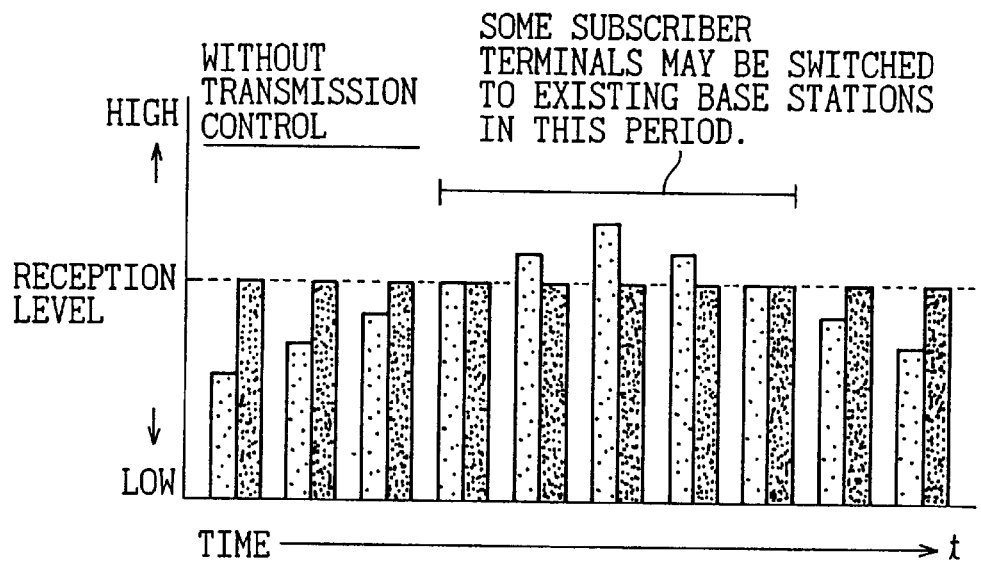
FIGS. 9A and 9B show transmission power control according to the present invention.
Figure 9B:
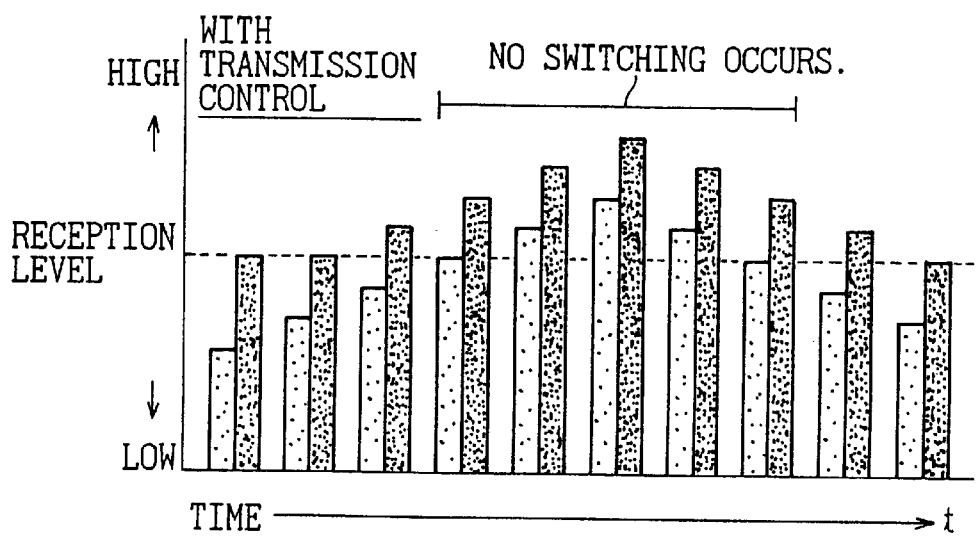
Figure 10B:
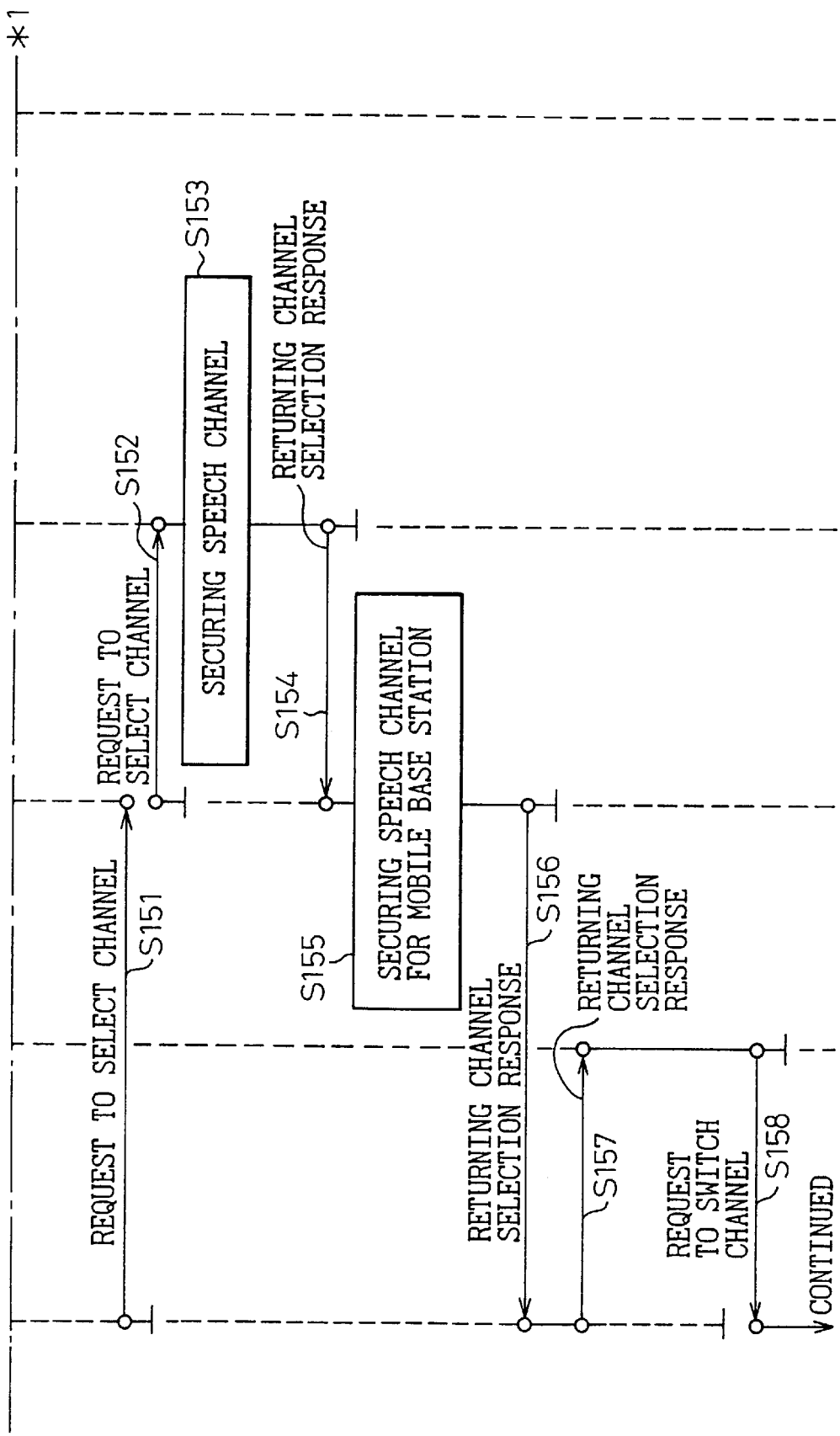

FIGS. 9A and 9B show an example of this transmission power control.

A thinly dotted bar represents the level of signals received by a subscriber terminal from an existing base station, and a densely dotted bar represents the level of signals received by the subscriber terminal from the mobile base station.

The example of FIG. 9A occurs when the mobile base station in which the subscriber terminal is present passes beside the existing base station. The reception power of the subscriber terminal reaches a peak at the center of FIG. 9A. If the transmission power of the mobile base station is fixed at a value that is higher than the peak, the mobile base station must excessively consume power. In addition, the mobile base station may provide peripheral subscriber terminals with unwanted radio waves when the mobile base station travels through an area where the level of signals received from existing base stations is low.

FIG. 9B shows an example of transmission power control according to the present invention to avoid the problem of FIG. 9A. The mobile base station variably controls the level of signals to transmit so that it is always higher by a predetermined value than the level of signals received from existing base stations. As a result, the level of signals transmitted from the mobile base station and received by subscriber terminals that are present in the mobile radio zones of the mobile base station is always higher than the level of signals transmitted from existing base stations and received by the subscriber terminals. Even when the mobile base station passes beside existing base stations, no switching operation occurs in the subscriber terminals. When the mobile base station moves away from an existing base station, the transmission power of the mobile base station decreases accordingly so that no unwanted radio waves are transmitted toward peripheral subscriber terminals.

2) Talking State

FIGS. 10A to 13 show the operation of a subscriber terminal in a talking state moving between a mobile radio zone and an existing radio zone.

In FIGS. 10A to 11B, the subscriber terminal in a talking state moves from an existing radio zone into a mobile radio zone.

The mobile base station is in an area where the existing radio zones of the existing base stations A and B overlap and moves toward the existing base station B. The subscriber terminal is talking through the existing base station A and moves into a mobile radio zone of the mobile base station. For the subscriber terminal, the radio condition of the mobile radio zone becomes better than that of the existing radio zone of the existing base station A. As a result, the subscriber terminal must switch the present channel to another. The subscriber terminal sends a radio condition report 2 to the existing base station A in step S141. The radio condition report 2 contains radio conditions relating to the existing base stations A and B and mobile base station and a mobile base station number.

According to the report 2, the existing base station A determines that the radio condition of the mobile radio zone is the most suitable for the subscriber terminal and requests the network to secure a speech channel in steps S143 and S144. The network retrieves an existing radio zone in which the mobile base station is present out of the home memory according to the mobile base station number contained in the report 2. Through existing base stations (in this example, the existing base stations A and B), the network requests the mobile base station to secure a speech channel in steps S145 to S147.

The mobile base station receives the request from the existing base station B in step S148 and secures a speech channel in step S153. The existing base station B secures a speech channel for the mobile base station in step S155. The network issues a channel switching instruction in step S162 to activate the respective channels in steps S164 and S166. Through the present existing base station A, the subscriber terminal receives a target radio channel in step S169.

The subscriber terminal and mobile base station, and the mobile base station and existing base station B synchronize each other in steps S170 and S172 to maintain the talking state of the subscriber terminal with no disruption. The existing base station A releases the present speech channel in step S176. When the talking state terminates, a position registering process is carried out as explained with reference to FIG. 6.

In FIGS. 12A to 13, the subscriber terminal of talking state moves from the mobile radio zone into an existing radio zone.

This may occur when the mobile base station of FIGS. 10A to 11B returns to the existing radio zone of the existing base station A. After exiting from the mobile radio zone, the subscriber terminal sends a radio condition report 2 about ambient radio conditions to the mobile base station in step S181. According to the report 2, the mobile base station determines that radio condition of the subscriber terminal is better in the existing radio zone than in the mobile radio zone, and requests the existing base station B, which is presently controlling the mobile base station, to secure a channel in steps S183 and S184.

The existing base station B passes the request to the network in step S185. The network instructs the existing base station A to secure a channel, and the existing base station A secures a speech channel accordingly in steps S186 and S187. The mobile base station specifies a target radio channel for the subscriber terminal in step S196. The subscriber terminal synchronizes itself with the existing base station A and maintains the talking state through the newly assigned channel in steps S197 to S199. The existing base station B and the mobile base station release the preceding channels in steps S202 and S203.

Similar to the cases of a subscriber terminal of waiting state moving between a mobile radio zone and an existing radio zone, the channel switching operation in the talking state takes place only the predetermined lag time after the detection of a change in a radio condition report 2, to avoid useless channel switching operations.

(2) Registering position and selecting control channels for mobile base station FIGS. 14A and 14B show a position registering operation of the mobile base station according to the present invention.

As soon as a power source is turned on, the mobile base station carries out a position registering operation to an existing base station (the existing base station A in this example) having an existing radio zone in which the mobile base station is present. The existing base station sends a report with a position number to the mobile base station. The mobile base station transmits the position number to the home memory through the existing base station, and the home memory relates the position number to a mobile base station number.

In FIGS. 14A and 14B, the mobile base station moves from the existing radio zone of the existing base station A into the existing radio zone of the existing base station B, scans perch channels in step S213, receives a report from the existing base station B in step S216, and detects a change in a position number in the report in step S217. The mobile base station carries out the position registering operation mentioned above in step S218.

A result of the position registering operation is recorded in the home memory of the network in step S224. As is apparent in FIGS. 14A and 14B, subscriber terminals controlled by the mobile base station are irrelevant to these processes. Accordingly, any subscriber terminal in the mobile radio zones of the mobile base station keeps a position number specific to the mobile base station even if the mobile base station carries out the position registering operation.

The mobile base station of the present invention involves subscriber terminals that exclusively use control channels whenever they make or receive calls. Accordingly, the mobile base station must have a plurality of control channels to make itself ready for control channel switching requests. If there are no incoming and outgoing calls, the mobile base station is in a waiting state similar to subscriber terminals. At this time, the control channels are on perch channels of a corresponding existing base station, or on scan perch channels.

If there is an incoming or outgoing call, the mobile base station selects one of the control channels that is available for communication and has a suitable quality and starts call control on the selected control channel. If the number of calls increases to fully occupy the control channel, the next available control channel having a suitable quality is selected. Since the mobile base station is always traveling, a control channel used first gradually deteriorates. On the other hand, control channels that are not used are always on perches that are available and have suitable quality in a corresponding existing radio zone.

The base controller 32 (FIG. 5) always selects a control channel that is available for communication and has good quality. The control channel presently used gradually deteriorates as the mobile base station travels, and therefore, is not used for new calls. Consequently, the control channel presently used will be put in a waiting state as soon as it starts to handle no calls. Then, this control channel scans an available perch of good quality in an existing radio zone. These processes are repeated.

FIG. 15 shows the control channel switching operation of the mobile base station according to the present invention.

In this example, the mobile base station has three control channels a, b, and c. The switching operation of these control channels will be explained.

In a situation (1), the control channel a handles a call through the existing base station A. In a situation (2), time has passed without change. In a situation (3), the control channel b starts to handle a call through the existing base station B, and the control channel a does not pick up a new call. In a situation (4), time has passed without change.

In a situation (5), the control channel a handles no call. In a situation (6), the control channel a scans perches and recognizes the existing base station D. The control channel c starts to handle a call through the existing base station C. The control channel b does not pick up a new call. In situations (7) and (8), time has passed without a change.

The control channels are used only when connecting incoming and outgoing calls, and therefore, an occupation time of the control channels is short. If there is a call that occupies a control channel for several seconds, the call is disconnected as abnormal. Accordingly, the control channels need only several seconds to restore a waiting state after use.

(3) Handling incoming call to subscriber terminal in mobile radio zone

Figure 17:
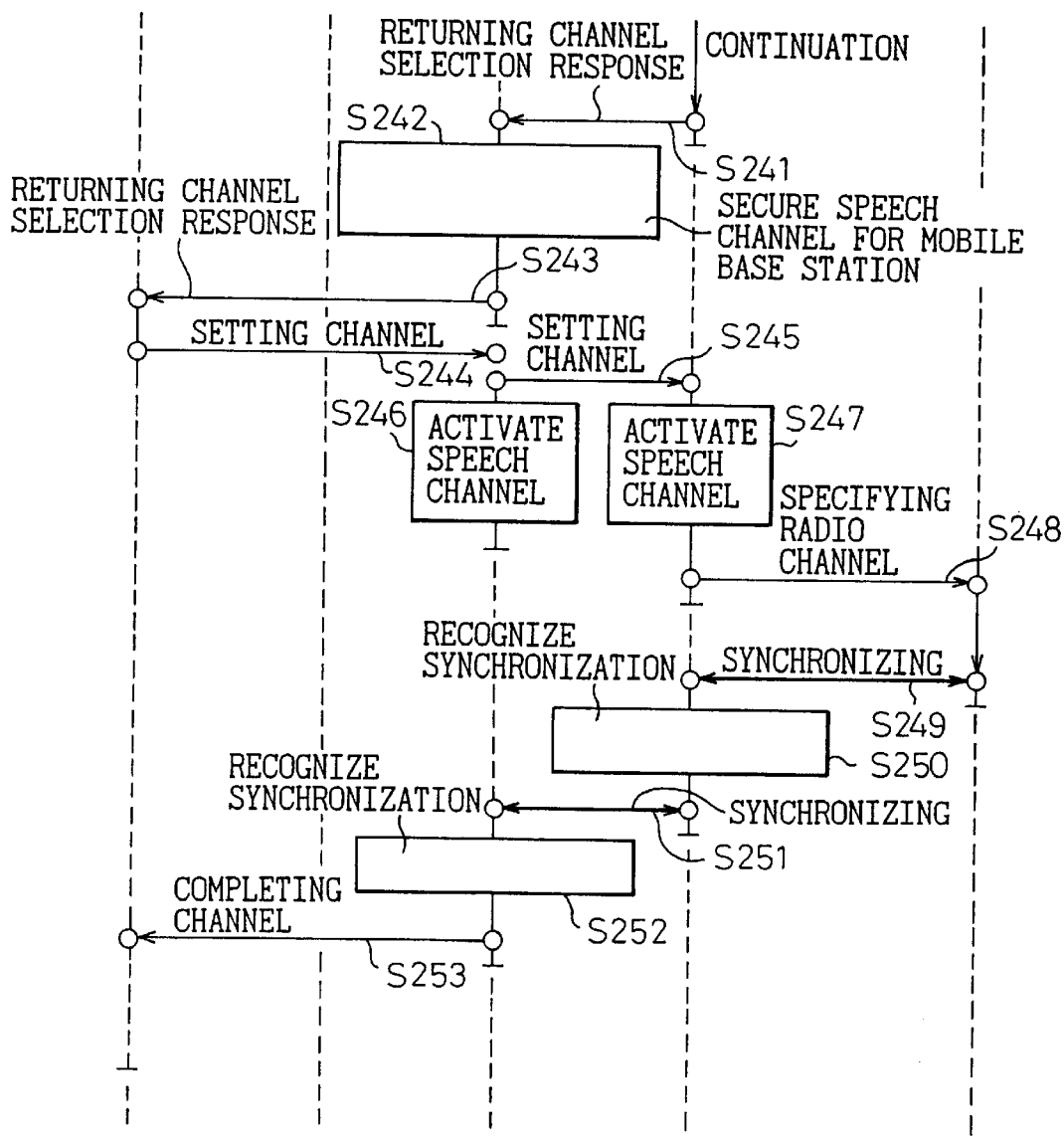

FIGS. 16 and 17 show an operation of handling an incoming call to a subscriber terminal that is present in one of the mobile radio zones of the mobile base station.

When an incoming call to the subscriber terminal occurs, the network retrieves positional data for the subscriber terminal out of the home memory. As explained in "(1) Handling subscriber terminal when it moves between existing radio zone and mobile radio zone," the positional data for the subscriber terminal has a mobile base station number instead of a position number. According to the mobile base station number, the home memory retrieves positional data for the mobile base station and obtains a position number in step S230.

Then, a call is made to an existing base station having the position number in steps S231 and S232. In this example, the existing base station B receives the call and calls the mobile base station in step S233. The mobile base station relays the call to the mobile radio zones thereof in step S234. The call is received by the corresponding subscriber terminal, which returns a radio receiving condition report in step S235. The mobile base station temporarily holds the report and secures a radio speech unit for the existing base station B. Thereafter, the mobile base station sends a radio receiving condition report to the existing base station B in step S236.

At this moment, the radio speech unit is available only at the mobile base station. Channel connection control is separately carried out between the existing base station B and the mobile base station, and between the subscriber terminal and the mobile base station. The report of the mobile base station is sent to the network through the existing base station B in step S237. According to the report, the network selects a speech channel to be used between the existing base station B and the mobile base station and issues an instruction that specifies the selected speech channel in step S238. The instruction is sent to the mobile base station through the existing base station B in step S239. At this moment, there is a possibility that a speech channel is established between another existing base station and the mobile base station. According to the instruction, the mobile base station activates the speech channel in step S247 and uses the radio speech unit to carry out synchronization and establish a speech channel between the existing base station B and the mobile base station in steps S251 to S253.

In the mean time, the mobile base station refers to the temporarily held radio condition report from the subscriber terminal, secures a speech channel in the mobile radio zone thereof, and informs the subscriber terminal of the secured speech channel in step S248. The mobile base station and subscriber terminal synchronize with each other and establish a speech channel between them in steps S249 and S250. Once the speech channels are established between the existing base station B and the mobile base station, and between the mobile base station and the subscriber terminal, call control signals are transferred between the network and the subscriber terminal through the speech channels, to complete the handling of the incoming call to the subscriber terminal.

(4) Handling outgoing call from subscriber terminal in mobile radio zone

FIGS. 18A and 18B show an operation of handling an outgoing call from a subscriber terminal that is present in one of the mobile radio zones of the mobile base station.

The subscriber terminal sends a radio transmitting condition report to the mobile base station in step S260. The mobile base station temporarily holds the report and transmits a radio transmitting condition report of its own to the existing base station B in step S261.

Steps S262 to S278 that follow are the same as steps S237 to S253 of FIGS. 16 and 17. Once speech channels are established between the existing base station B and the mobile base station, and between the mobile base station and the subscriber terminal, call control signals are transferred between the network and the subscriber terminal through the speech channels, to complete the handling of the outgoing call from the subscriber terminal.

(5) Switching channels for call of subscriber terminal in mobile radio zone

A channel switching operation for a call of a subscriber terminal that is present in one of the mobile radio zones of the mobile base station is classified into a channel switching operation between existing radio zones, and a channel switching operation between the mobile radio zones of the mobile base station.

1) Channel Switching Operation Between Existing Radio Zones

Figure 19A:
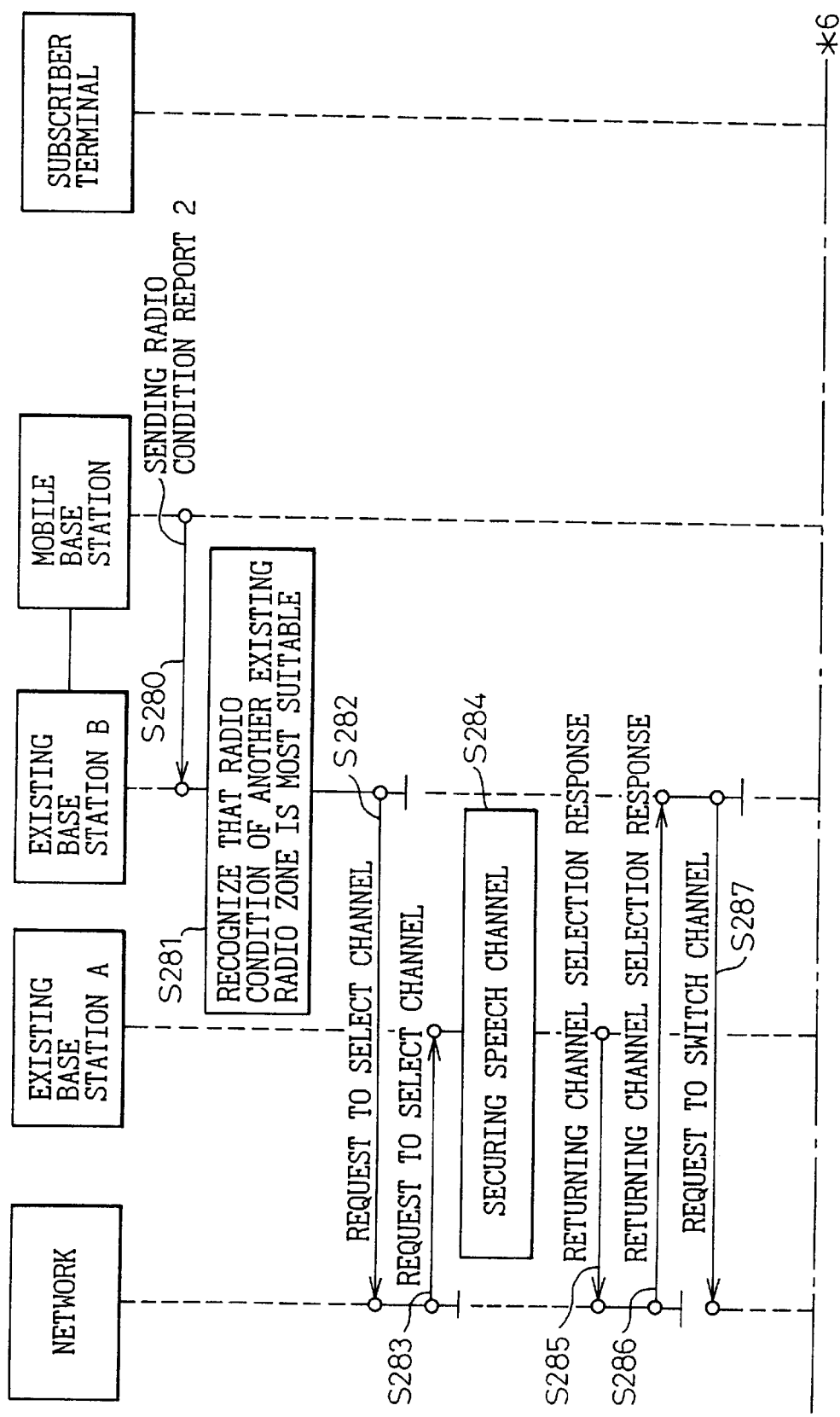

FIGS. 19A and 19B show a channel switching operation of the mobile base station between existing radio zones.

The mobile base station is traveling while periodically obtaining radio condition reports from the existing radio zones of peripheral existing base stations. A call of a subscriber terminal that is present in one of the mobile radio zones of the mobile base station is connected to, for example, the existing base station B through a speech channel. If the radio condition of the speech channel connected to the existing base station B deteriorates below the radio condition of the existing base station A, the mobile base station sends a radio condition report 2 in step S280 to the existing base station B with a request for actively switching channels.

Upon receiving the request, the existing base station B requests the network to issue an instruction to specify a new radio channel. Upon receiving the instruction from the network, the existing base station B transfers it to the mobile base station in step S292. The mobile base station synchronizes the new channel with the existing base station A and switches the present speech channel connected to the existing base station B to the new channel connected to the existing base station A in step S293. The existing base station B releases the present channel in step S297. Subscriber terminals under the control of the mobile base station never participate in these operations, and therefore, no channel switching occurs in the subscriber terminals.

2) Channel Switching Between Mobile Radio Zones

Figure 20:
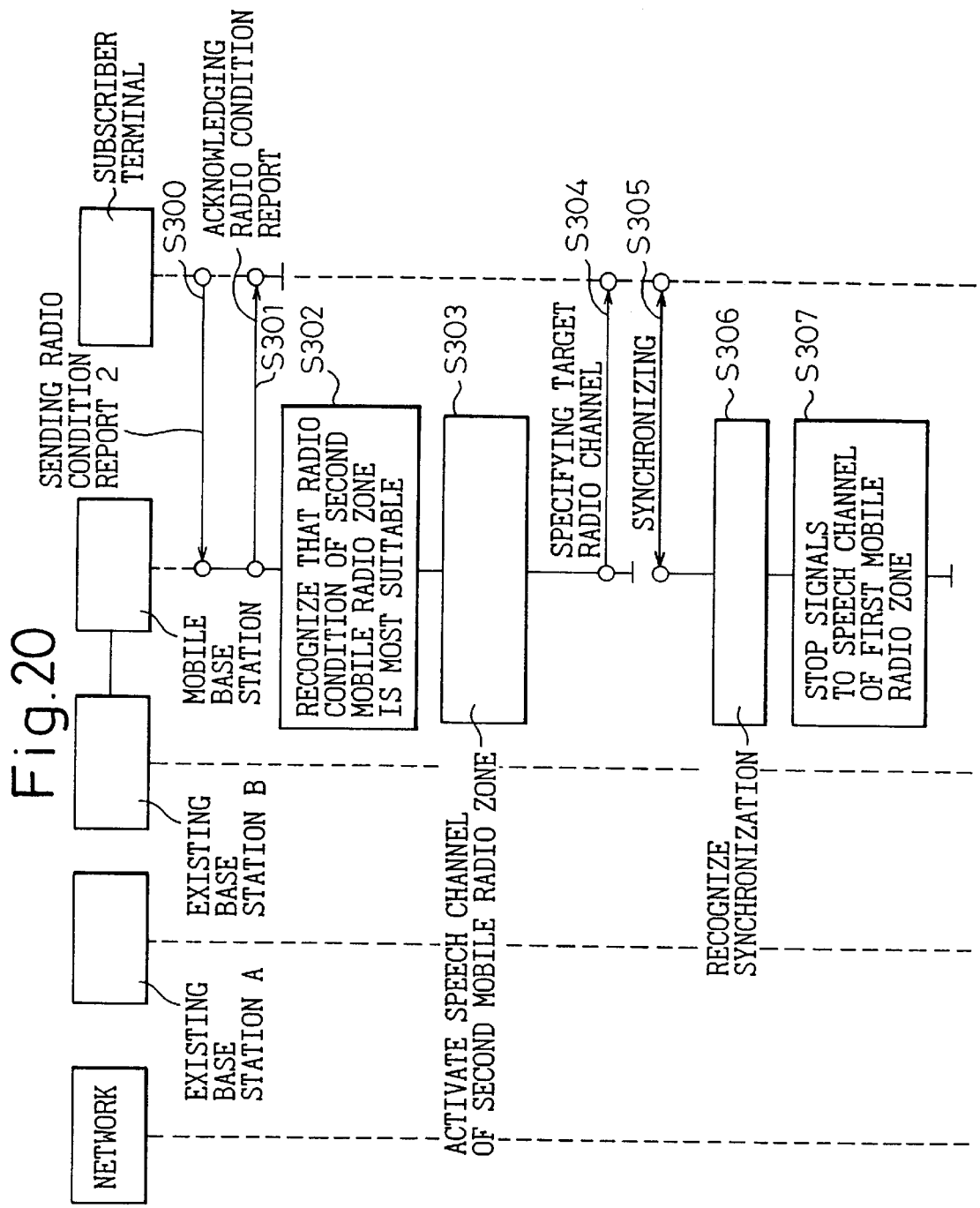
FIG. 20 shows a channel switching operation of a mobile base station between mobile radio zones, according to the present invention.

FIG. 20 shows a channel switching operation of a subscriber terminal between the mobile radio zones of the mobile base station.

The mobile base station is installed in a mobile space such as a train, to control mobile radio zones allocated to cars of the train. While the mobile base station is traveling, the user of a subscriber terminal moves from one mobile radio zone to another, i.e., from one car to another.

The subscriber terminal receives zone data from the mobile base station and from peripheral existing base stations and monitors the radio conditions of the zones. The subscriber terminal periodically sends a radio condition report 2 to the mobile base station in step S300. If the subscriber terminal moves from a first mobile radio zone to a second, the radio condition of the first one deteriorates, and that of the second one improves.

At this time, the mobile base station determines that the radio condition of the second mobile radio zone is better for the subscriber terminal than that of the first one, secures a channel of the second one, and informs the subscriber terminal of the new channel in steps S302 to S304. As soon as the subscriber terminal synchronizes itself with the new channel, the speech channel to the first mobile radio zone is switched to the new one in steps S305 to S307.

Contrary to the example of FIGS. 19A and 19B, existing base stations never participate in these operations. Accordingly, no channel switching operation takes place between the mobile base station and the existing base stations during the above operations. If errors such as communication bit errors occur between the mobile base station and the subscriber terminal, the mobile base station determines that the radio condition is deteriorating and carries out channel switching between the mobile radio zones thereof.

(6) Cutting call of subscriber terminal in mobile radio zone

The cutting of a call of a subscriber terminal that is present in one of the mobile radio zones of the mobile base station is classified into a cut on speech completion, a squelch between the mobile base station and an existing base station, and a squelch between the mobile base station and the subscriber terminal.

1) Cut on Speech Completion

Figure 21:
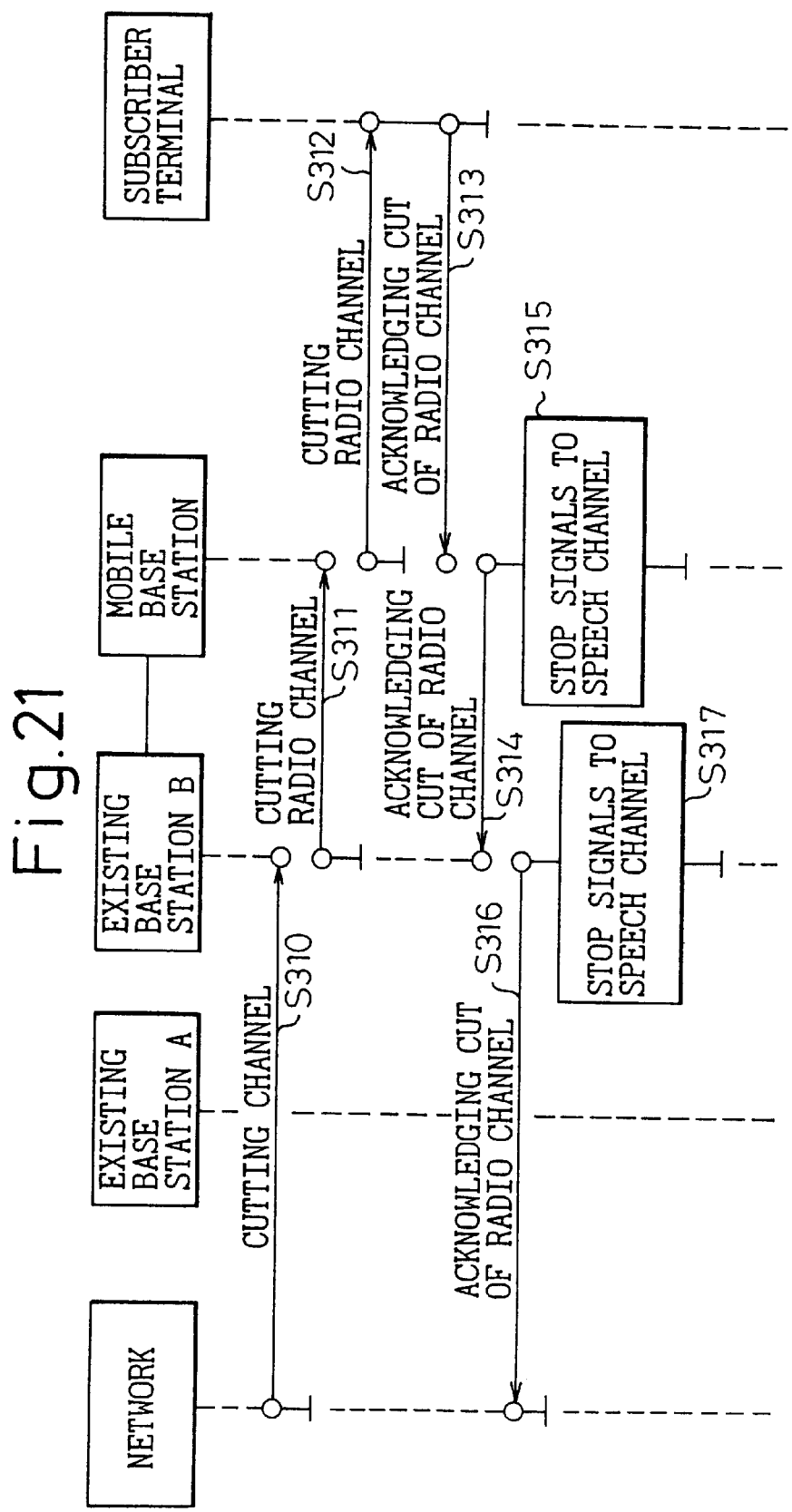
FIG. 21 shows a speech termination operation according to the present invention.

FIG. 21 shows a speech completion operation.

When a speech completes from the network, a speech completion process is carried out between the existing base station and subscriber terminal that relate to the call, through a speech channel. The network informs the mobile base station of the cutting of the channel through the existing base station in steps S310 and S311. The mobile base station relays the channel cut to the subscriber terminal in step S312 and returns a channel cut acknowledgement to the existing base station in step S314. The existing base station cuts the speech channel in step S317. The subscriber terminal receives the channel cut in step S312 and returns an acknowledgement in step S313.

Upon receiving the channel cut acknowledgement from the subscriber terminal, the mobile base station cuts a speech channel to the subscriber terminal in step S315. If a speech completes at the subscriber terminal, the speech completion process is carried out between the subscriber terminal and the existing base station through the speech channel between them. The network informs the mobile base station of a channel cut through the existing base station. The processes that follow are the same as those mentioned above.

2) Squelch Between Mobile Base Station and Existing Base Station

Figure 22:
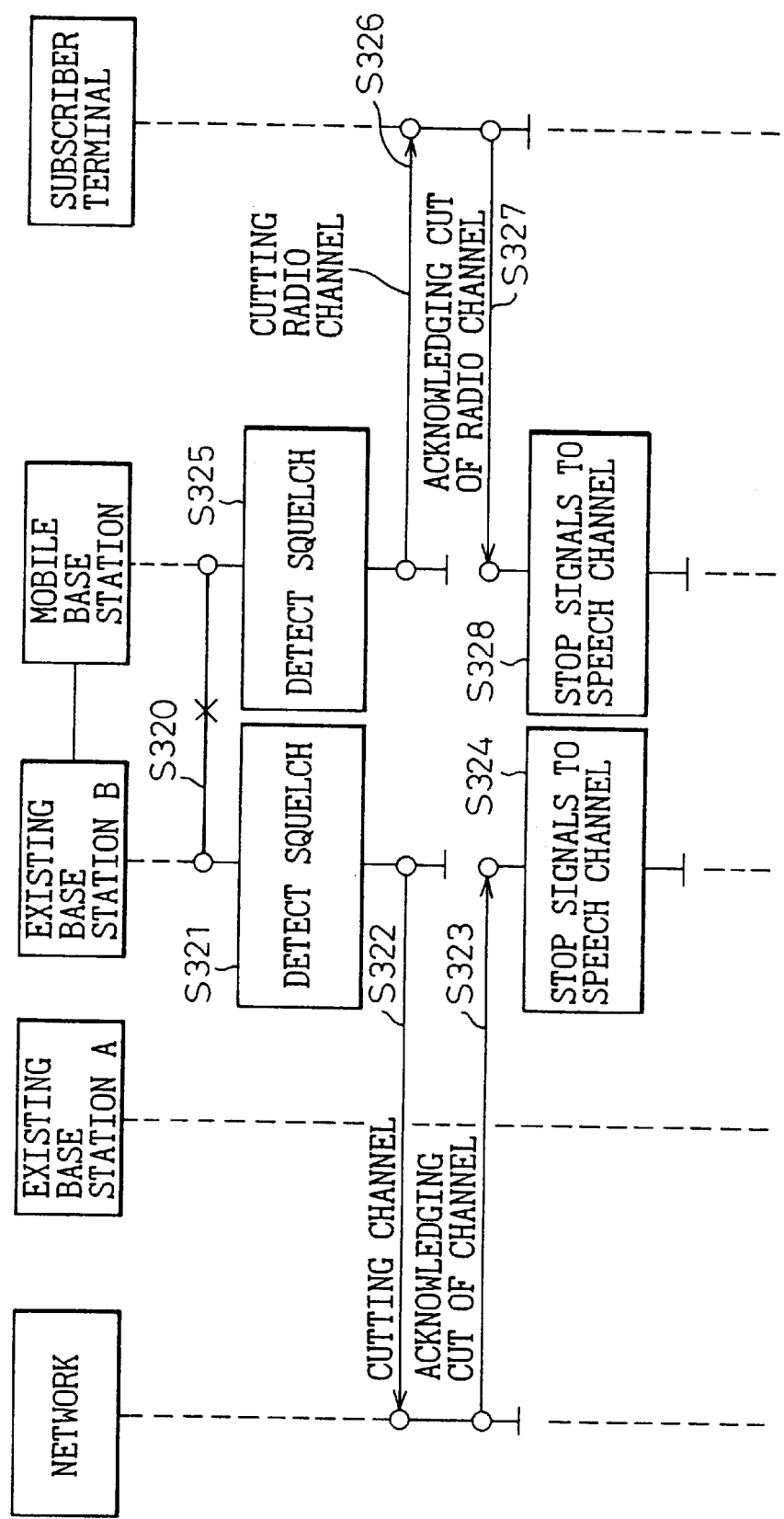
FIG. 22 shows a squelch operation between a mobile base station and an existing base station, according to the present invention.

FIG. 22 shows a squelch operation between the mobile base station and the existing base station B.

The mobile base station and existing base station B monitor speech channels and find that a radio condition between them is lower than a predetermined level. If this low-level condition continues for a predetermined time, a squelch action is carried out in steps S320, S321, and S325.

The existing base station B informs the network of a channel cut and cuts the speech channel in steps S322 to S324. On the other hand, the mobile base station informs a corresponding subscriber terminal of the channel cut (squelch) in step S326 and waits for an acknowledgement from the subscriber terminal. Upon receiving the acknowledgement in step S327, the mobile base station cuts a corresponding speech channel in step S328.

3) Squelch Between Mobile Base Station and Subscriber Terminal

Figure 23:
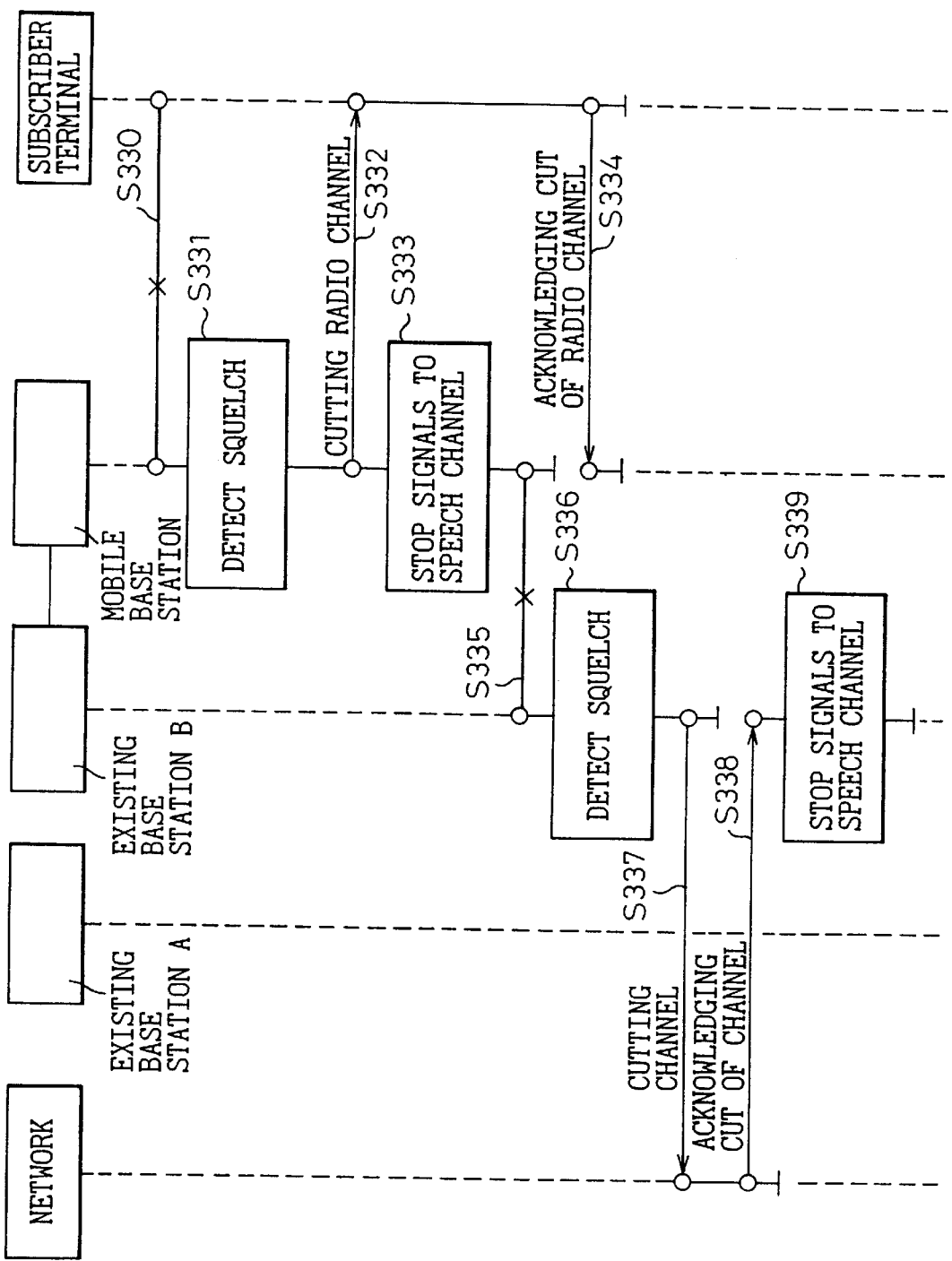
FIG. 23 shows a squelch operation between a mobile base station and a subscriber terminal, according to the present invention.

FIG. 23 shows a squelch operation between the mobile base station and a subscriber terminal.

The mobile base station monitors the radio condition of a speech channel connected to the subscriber terminal. If the radio condition deteriorates below a predetermined level and if it does not improve for a predetermined time in step S330, the mobile base station informs the subscriber terminal of a channel cut (squelch) in step S332. This information will not be received by the subscriber terminal due to the deterioration of the radio condition.

At the same time, the mobile base station stops signal transmission through a speech channel to the existing base station B in step S335. As a result, the existing base station B acknowledges the squelch in the mobile base station in step S336, and requests the network to carry out a speech channel cutting operation similar to the case of FIG. 22.

(7) Exclusive Services in Mobile Radio Zone

The present invention provides a variety of exclusive services to the train in which the mobile base station is installed. The services are provided with voice and digital signals through speech channels or as a small amount of information through control channels.

1) Services Through Speech Channels

Figure 24:
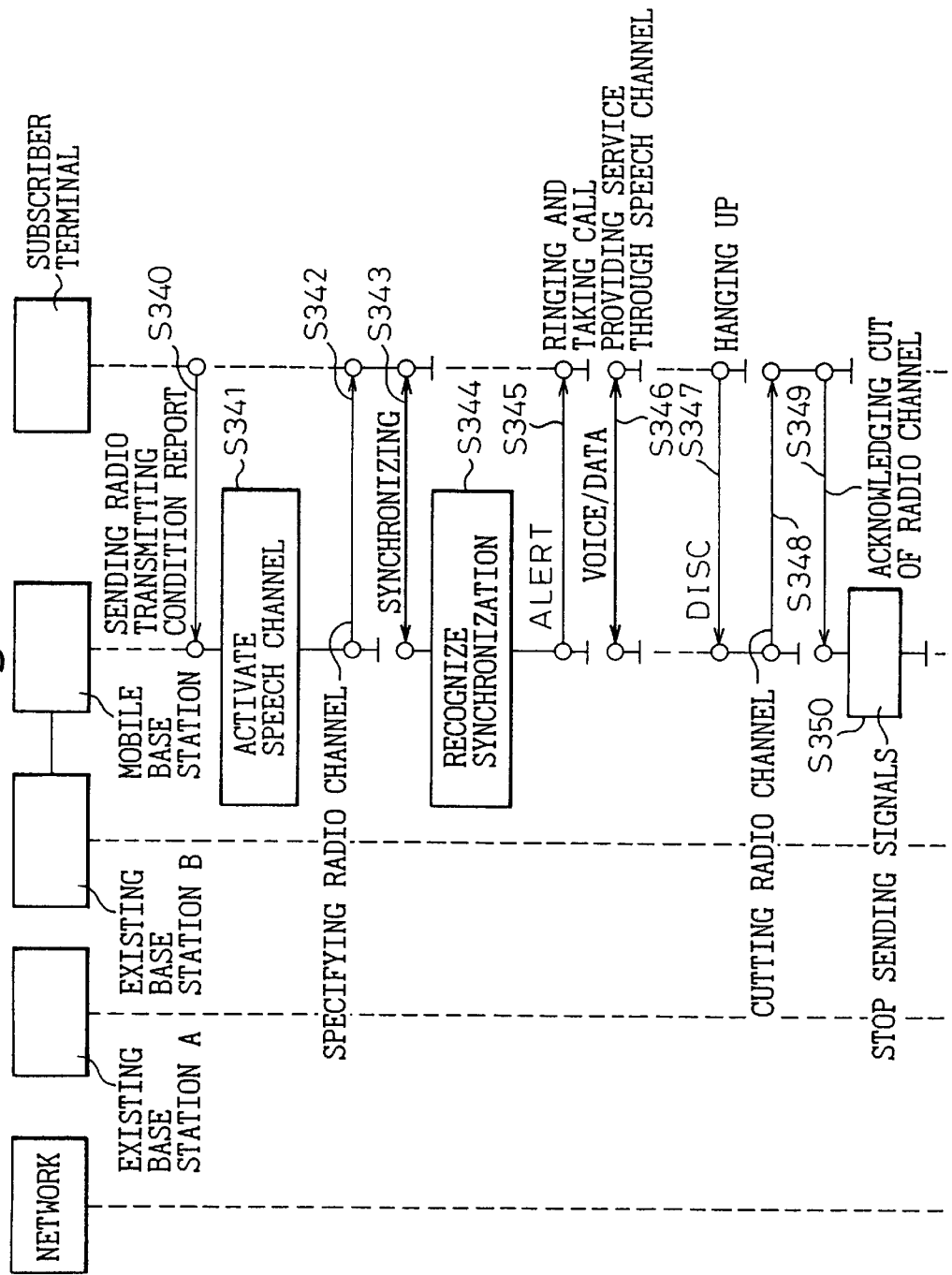
FIG. 24 shows an operation of providing additional services through speech channels, according to the present invention.

FIG. 24 shows exclusive services provided in the train through speech channels.

The services may be special dial services. The user of a subscriber terminal dials a special number starting with, for example, "#," or "*" in step S340. The main controller 34 (FIG. 5) of the mobile base station recognizes the special number, and the additional-service supplier 35 determines the contents of a service corresponding to the special number. This service may be to call an information desk in the train and is provided in step S345.

The example of FIG. 24 does not limit the kinds of services provided in step S346 through speech channels. The speech channels may be used to provide voice information or for data communication such as personal-computer communication and facsimile communication. The services may include ordering something from a cafeteria in the train and asking for some sightseeing information.

2) Services Through Control Channels

Figure 25:
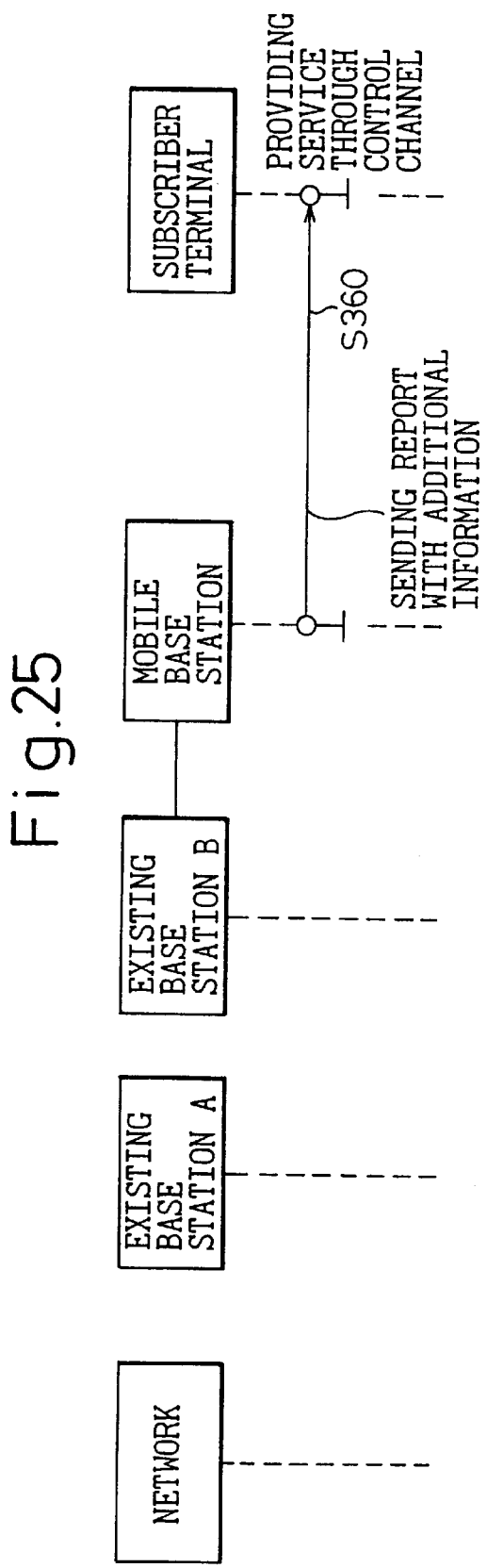
FIG. 25 shows an operation of providing additional services through control channels, according to the present invention.
Figure 26:
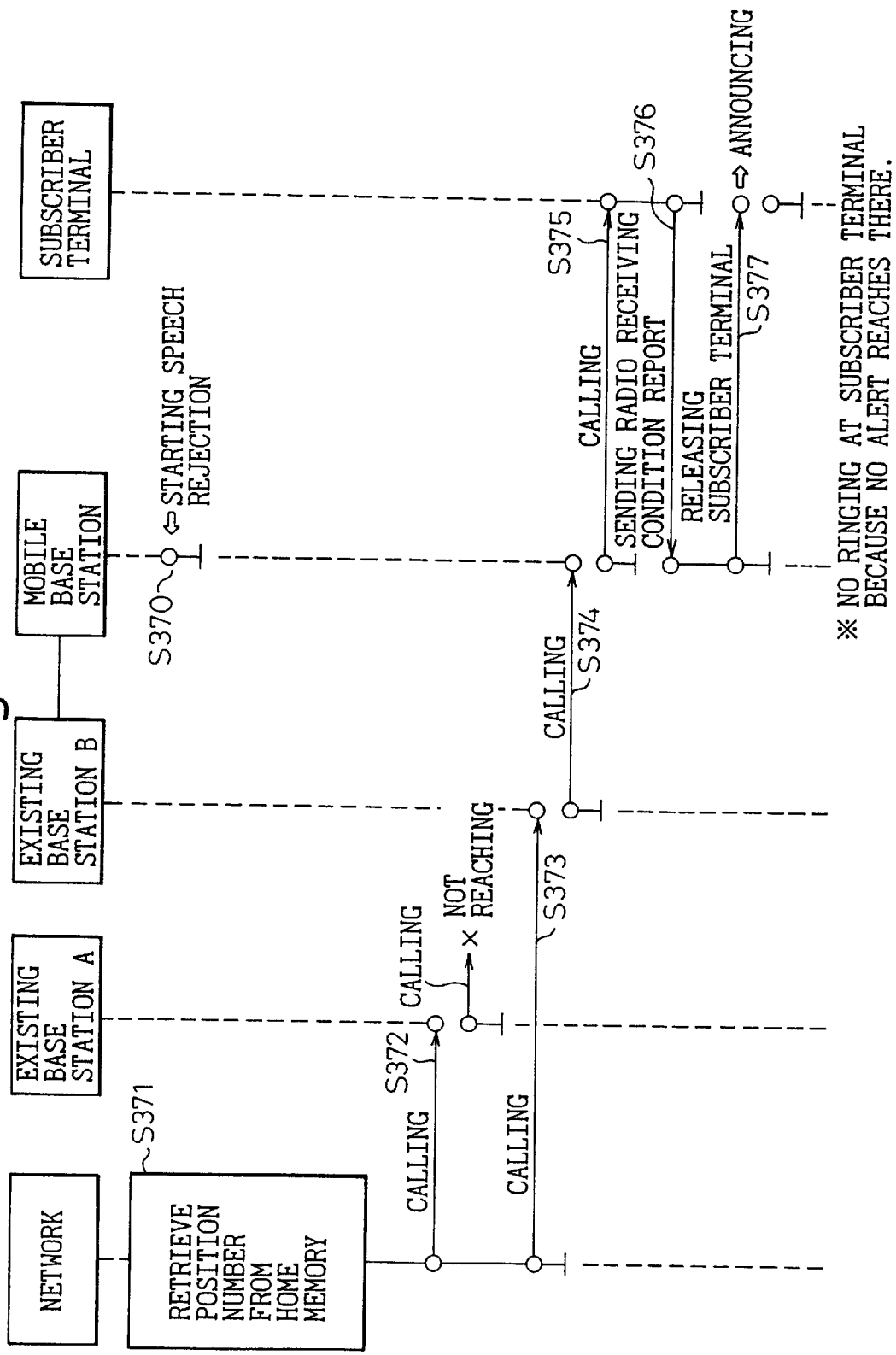
FIG. 26 shows an operation of providing an incoming call rejection service according to the present invention.
Figure 27:
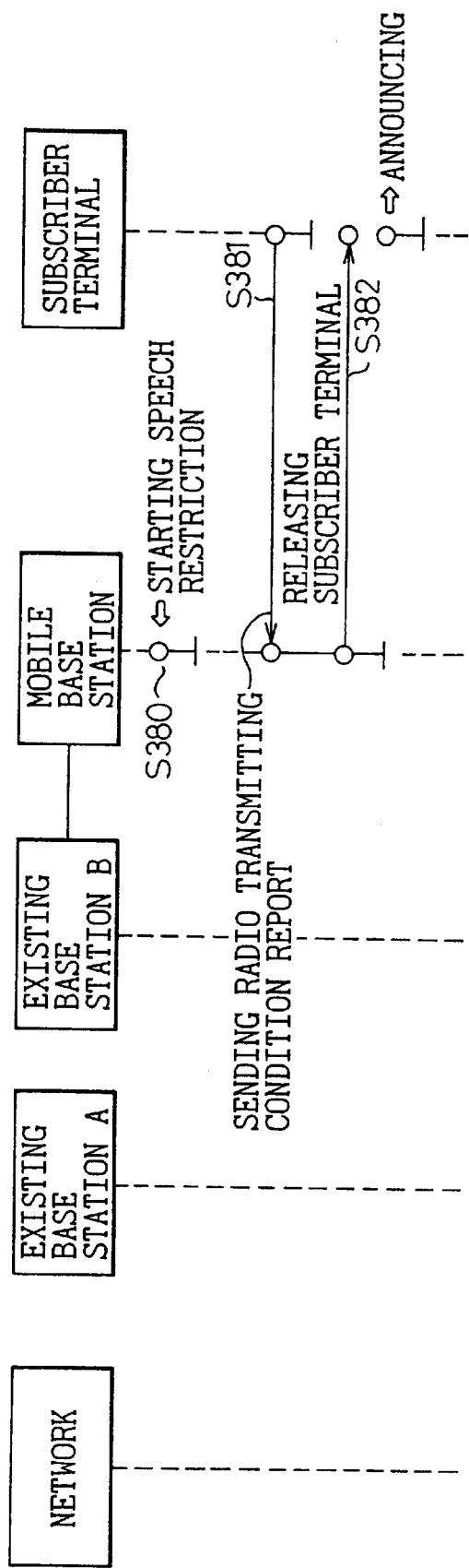
FIG. 27 shows an operation of providing an outgoing call rejection service according to the present invention.

FIGS. 25 to 27 show services provided through control channels in the train.

In FIG. 25, a subscriber terminal receives additional information through a control channel. The mobile base station periodically sends the additional information with a radio condition report to subscriber terminals in step S360. The additional information may be sent at other timings or at given intervals.

Each subscriber terminal always receives a radio condition report from the mobile base station. Upon receiving the additional information, the subscriber terminal may display it on an LCD part thereof. The additional information may include an arrival announcement for the next stop. The additional-service supplier 35 (FIG. 5) asks the main controller 34 to provide such a service, and the main controller 34 adds the service to the radio condition report and sends it to the subscriber terminals.

FIGS. 26 and 27 show a service for rejecting outgoing and incoming calls. This service uses information about restrictions contained in a radio condition report periodically transmitted to subscriber terminals. As soon as the train starts, the outgoing and incoming call rejection service starts. In FIG. 26, the incoming call rejection service turns on a speech rejection in step S370. If there is an incoming call from the network to a subscriber terminal in steps S373 to S375, the mobile base station releases the subscriber terminal in step S377 without sending an alert message to the subscriber terminal. In this case, no ringing occurs on the subscriber terminal.

In FIG. 27, the outgoing call rejection service turns on a speech rejection in step S380. If there is an outgoing call from a subscriber terminal in step S381, the mobile base station simply releases the subscriber terminal in step S382. In the case of a usual incoming/outgoing call restriction, the user of a subscriber terminal may move to another mobile radio zone in another car where communication may be possible if an outgoing call is rejected. On the other hand, since the present invention shuts down outgoing and incoming call sequences itself, the user may not attempt to move to another mobile radio zone.

The present invention may provide a variety of information restriction services. For example, a specific mobile radio zone such as one for a first-class car may be put outside the outgoing and incoming call restrictions. This may discriminate services depending on mobile radio zones.

3) Services Through Speech and Control Channels

Figure 28:
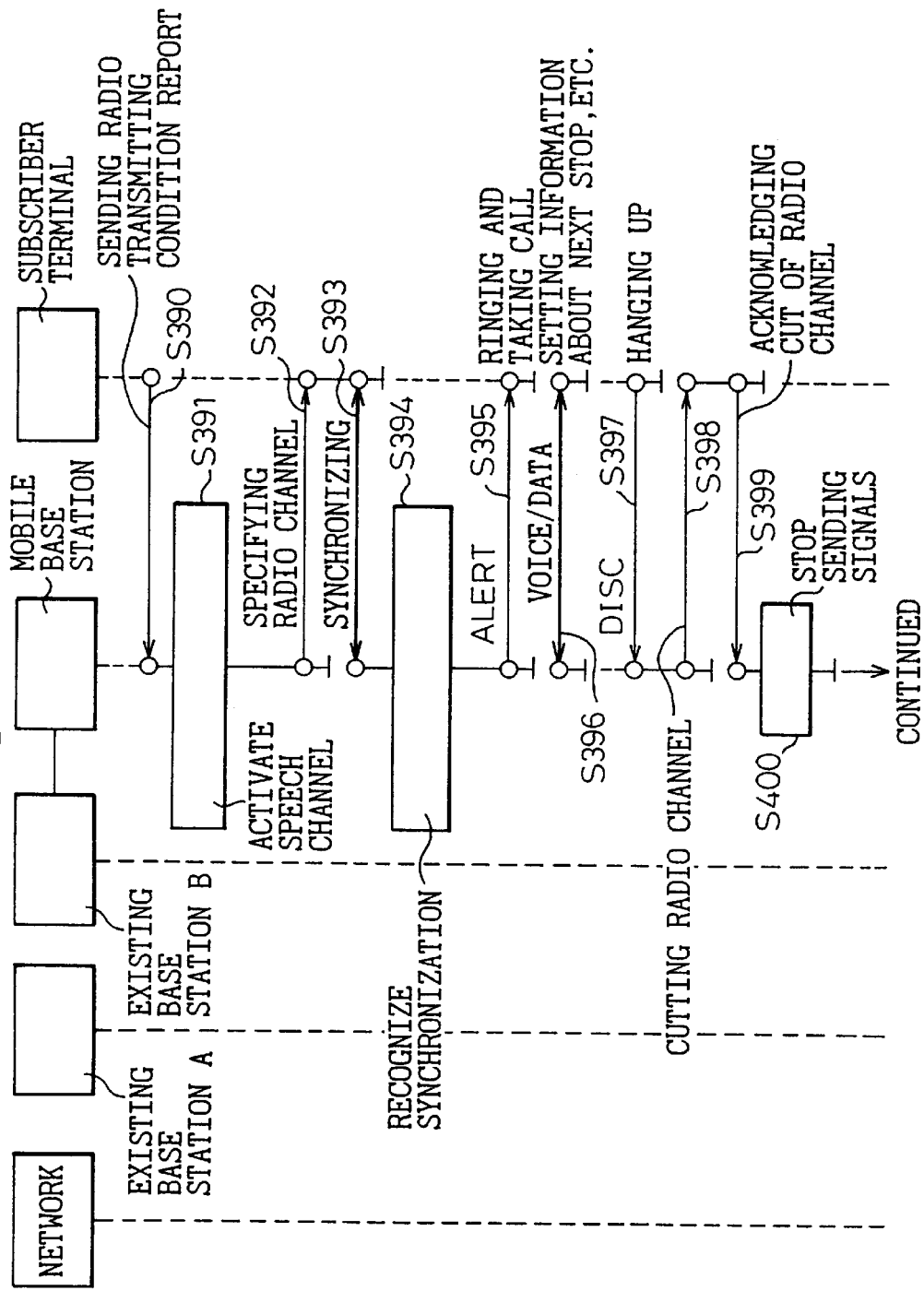
FIGS. 28 and 29 show an operation of providing additional services through speech and control channels, according to the present invention.
Figure 29:
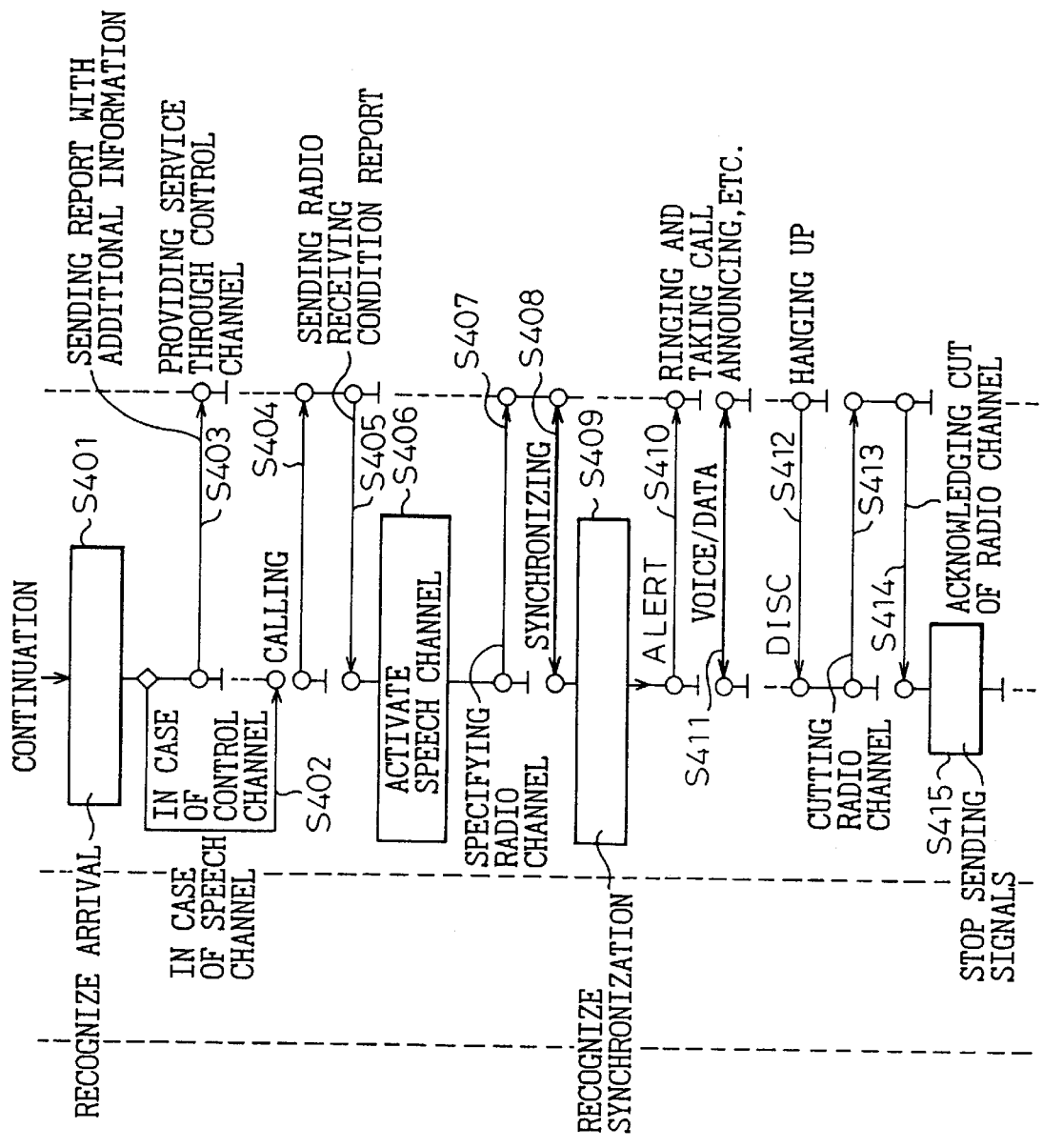

FIGS. 28 and 29 show services provided through speech and control channels in the train.

The user of a subscriber terminal issues a voice or data instruction to the additional-service supplier 35 (FIG. 5) through a speech channel. After a predetermined time, a reply is sent to the subscriber terminal through a control channel.

This service is a combination of the service of FIG. 24 provided through speech channels and the service of FIG. 25 provided through control channels. Namely, steps S390 to S400 correspond to the services using speech channels, and steps S401 to S403 to the services using control channels. A replay to the subscriber terminal may be sent through a speech channel instead of a control channel, as in steps S402 to S415. This service may be realized in such a way that the user of a subscriber terminal makes a request by voice for information about, for example, a destination, and the mobile base station returns arrival time for the destination. The arrival time is displayed on a display part of the subscriber terminal.

As explained above, the present invention provides the special effects of:

(1) providing subscriber terminals that are present in the mobile radio zones of a mobile base station, with services specific to the mobile base station without deteriorating communication quality;

(2) reducing the numbers of channel switching and position registering operations even during the highspeed traveling of the mobile base station, to suppress congestion in a network that controls the mobile base station and reduce the power consumption of the subscriber terminals; and (3) providing such specific services even to an immobile area (or a mobile area moving at a speed of zero) by allocating a radio zone to the immobile area.

What is claimed is:

1. A mobile communication system comprising:
   an existing base station for controlling a fixed radio zone that covers a predetermined area;
   a mobile base station for controlling a mobile radio zone that covers an inner space of a mobile object; and
   a mobile terminal, wherein the mobile base station has:
      first communication means for communicating with the existing base station such that the mobile base station serves as a mobile base station for the existing base station;
      second communication means for communicating with the mobile terminal such that the mobile base station serves as a fixed base station for the mobile terminal when the mobile terminal is present in the mobile radio zone of the mobile base station; and
      main control means for controlling path connection between the first and second communication means, and
      wherein the second communication means transmits signals whose level is greater than the level of signals received from the fixed radio zone, and
      wherein the level of signals to be transmitted is controlled to be relatively greater than the level of received signals.

2. The system of claim 1, wherein the first communication means connects and switches channels to the existing base station, independently of the second communication means.

3. The system of claim 1, wherein the first communication means has control channels to the existing base station and successively scans perches for unused control channels.

4. The system of claim 1, wherein the second communication means connects and switches channels to the mobile terminal, independently of the first communication means.

5. The system of claim 4, wherein the second communication means controls at least one mobile radio zone and communicates with mobile terminals that are present in the mobile radio zones such that the mobile base station serves as a fixed base station for the mobile terminals.

6. A mobile communication system comprising:
   an existing base station for controlling a fixed radio zone that covers a predetermined area;
   a mobile base station controlling a mobile radio zone that covers an inner space of a mobile object; and
   a mobile terminal, the mobile base station having:
      first communication means for communicating with the existing base station such that the mobile base station serves as a mobile base station for the existing base station;
      second communication means for communicating with the mobile terminal such that the mobile base station serves as a fixed base station for the mobile terminal when the mobile terminal is present in the mobile radio zone of the mobile base station; and
      main control means for controlling path connection between the first and second communication means,
      wherein the mobile base station further has:
         additional-service supply means for supplying additional communication services exclusively to the mobile radio zone.

7. The system of claim 6, wherein the additional communication services are individually supplied to mobile radio zones that are under the control of the mobile base station.

8. The system of claim 1, wherein the mobile terminal connects and switches channels when entering into or exiting from the mobile radio zone if an entered or exited state lasts for a predetermined time.

9. The system of claim 1, wherein the mobile base station confirms that the mobile terminal has entered into or exited from the mobile radio zone if an entered or exited state continues for a predetermined time.

10. The system of claim 1, wherein the existing base station confirms that the mobile terminal has entered into or exited from the mobile radio zone if an entered or exited state continues for a predetermined time.

11. A mobile base station provided for a mobile object, for communicating with an existing base station having a fixed radio zone covering a predetermined area and with mobile terminals, and controlling mobile radio zones allocated to inner spaces of the mobile object, comprising:
   base communication means for communicating with the existing base station;
   terminal communication means for communicating with the mobile terminals that are present in the mobile radio zones;
   main communication control means for controlling communication between the base communication means and the terminal communication means and providing exclusive services to the mobile terminals that are present in the mobile radio zones; and
   an additional-service supplier for providing the exclusive services to the mobile terminals that are present in the mobile radio zones.

12. The mobile base station of claim 11, wherein the base communication means has:
   a base transceiver for communicating with existing base stations that form a mobile communication service network; and
   a base controller for controlling the base transceiver and securing channels for the base transceiver.

13. The mobile base station of claim 11, wherein the terminal communication means has:
   a terminal transceiver for communicating with the mobile terminals; and
   a terminal controller for controlling the terminal transceiver and securing channels for the mobile terminals that move between the mobile radio zones.

14. The mobile base station of claim 12, wherein the base transceiver has control channel units for the existing base station, and wherein unused control channel units sequentially scan perches.

15. The mobile base station of claim 13, wherein the terminal transceiver controls the level of radio signals in the mobile radio zones to control the level of perches for the mobile terminals.

16. In a method of controlling communication among a network, existing base stations each for controlling a fixed radio zone that covers a predetermined area, a mobile base station for controlling at least one mobile radio zone allocated to an inner space of a mobile object, and mobile terminals, a method of registering the position of one of the mobile terminals that enters into the mobile radio zone from one of the fixed radio zones, comprising the steps of:
   making the mobile terminal receive a report and actively issue, according to the report, a request for updating a registered position, the request accompanying information about the mobile base station;
   making the mobile base station receive the request and transfer the same to the network through the existing base station that controls the fixed radio zone in question; and
   making the network receive the request and update the registered position of the mobile terminal stored in a home memory by the information about the mobile base station; and
   in the method of controlling communication, a method of registering the position of one of the mobile terminals that exits from the mobile radio zone, comprising the steps of:
      making the mobile terminal receive a report and actively issue, according to the report, a request for updating a registered position, the request accompanying information about the mobile base station;
      making a proper one of the existing base stations receive the request and transfer the same to the network, and
      making the network receive the request and update the registered position of the mobile terminal stored in a home memory accordingly.

17. In a method of controlling communication among a network, existing base stations each for controlling a fixed radio zone that covers a predetermined area, a mobile base station for controlling at least one mobile radio zone allocated to an inner space of a mobile object, and mobile terminals, a method of registering the position of one of the mobile terminals that enters into the mobile radio zone from one of the fixed radio zones, comprising the steps of:
   making the mobile terminal receive a report and actively issue, according to the report, a request for updating a registered position, the request accompanying information about the mobile base station;
   making the mobile base station receive the request and transfer the same to the network through the existing base station that controls the fixed radio zone in question; and
   making the network receive the request and update the registered position of the mobile terminal stored in a home memory by the information about the mobile base station; and
   in the method of controlling communication, a method of controlling speech channels when one of the mobile terminals that is in a talking state enters into the mobile radio zone from one of the fixed radio zones, comprising the steps of:
      making the mobile terminal actively issue a request for switching channels, the request accompanying a radio condition report and information about the mobile base station;
      making the existing base station that controls the fixed radio zone in question receive the request and transfer the same to the network;
      making the network receive the request and issue a request for securing a channel for the mobile base station according to the information about the mobile base station whose radio condition is determined to be the most suitable for the mobile terminal;
      making the mobile base station set, according to the channel securing request, a new speech channel between the mobile base station and a proper one of the existing base stations; and
      using the new speech channel to set a speech channel between the mobile base station and the mobile terminal.

18. In a method of controlling communication among a network, existing base stations each for controlling a fixed radio zone that covers a predetermined area, a mobile base station for controlling at least one mobile radio zone allocated to an inner space of a mobile object, and mobile terminals, a method of registering the position of one of the mobile terminals that enters into the mobile radio zone from one of the fixed radio zones, comprising the steps of:

making the mobile terminal receive a report and actively issue, according to the report, a request for updating a registered position, the request accompanying information about the mobile base station;

making the mobile base station receive the request and transfer the same to the network through the existing base station that controls the fixed radio zone in question; and making the network receive the request and update the registered position of the mobile terminal stored in a home memory by the information about the mobile base station; and in the method of controlling communication, a method of controlling speech channels when one of the mobile terminals that is in a talking state exits from the mobile radio zone, comprising the steps of:

making the mobile terminal actively issue a request for switching channels, the request accompanying a radio condition report and information about the mobile base station;

making the mobile base station receive the request and transfer the same to the network through a proper one of the existing base stations;

making the network receive the request and issue a request for securing a channel for one of the existing base stations whose radio condition is determined to be the most suitable according to the radio condition report; and making the existing base station of the most suitable radio condition set, according to the channel securing request, a new speech channel to the mobile terminal.

19. In a method of controlling communication among a network, existing base stations each for controlling a fixed radio zone that covers a predetermined area, a mobile base station for controlling at least one mobile radio zone allocated to an inner space of a mobile object, and mobile terminals, a method of registering the position of one of the mobile terminals that enters into the mobile radio zone from one of the fixed radio zones, comprising the steps of:

making the mobile terminal receive a report and actively issue, according to the report, a request for updating a registered position, the request accompanying information about the mobile base station;

making the mobile base station receive the request and transfer the same to the network through the existing base station that controls the fixed radio zone in question; and making the network receive the request and update the registered position of the mobile terminal stored in a home memory by the information about the mobile base station; and in the method of controlling communication, a method of registering a position of the mobile base station that is moving, comprising the steps of:

making the mobile base station receive a report and actively issue, according to the report, a request for updating a registered position, the request accompanying information about the mobile base station;

making the network receive the request and issue a request for securing a channel for one of the existing base stations whose radio condition is determined to be the most suitable according to the radio condition report; and making the network receive the request and update the registered position of the mobile base station stored in a home memory accordingly.

20. In a method of controlling communication among a network, existing base stations each for controlling a fixed radio zone that covers a predetermined area, a mobile base station for controlling at least one mobile radio zone allocated to an inner space of a mobile object, and mobile terminals, a method of registering the position of one of the mobile terminals that enters into the mobile radio zone from one of the fixed radio zones, comprising the steps of:

making the mobile terminal receive a report and actively issue, according to the report, a request for updating a registered position, the request accompanying information about the mobile base station;

making the mobile base station receive the request and transfer the same to the network through the existing base station that controls the fixed radio zone in question; and making the network receive the request and update the registered position of the mobile terminal stored in a home memory by the information about the mobile base station; and in the method of controlling communication, a method of controlling channels of the mobile base station that is moving, comprising the steps of:

making the mobile base station actively issue a request for switching channels, the request accompanying a radio condition report and information about the mobile base station;

making a proper one of the existing base stations receive the request and transfer the same to the network;

making the network receive the request and issue a request for securing a channel for one of the existing base stations whose radio condition is determined to be the most suitable according to the radio condition report; and making the existing base station of the most suitable radio condition set, according to the channel securing request, a new speech channel to the mobile base station.

21. In a method of controlling communication among a network, existing base stations each for controlling a fixed radio zone that covers a predetermined area, a mobile base station for controlling at least one mobile radio zone allocated to an inner space of a mobile object, and mobile terminals, a method of registering the position of one of the mobile terminals that enters into the mobile radio zone from one of the fixed radio zones, comprising the steps of:

making the mobile terminal receive a report and actively issue, according to the report, a request for updating a registered position, the request accompanying information about the mobile base station;

making the mobile base station receive the request and transfer the same to the network through the existing base station that controls the fixed radio zone in question; and making the network receive the request and update the registered position of the mobile terminal stored in a home memory by the information about the mobile base station; and in the method of controlling communication, a method of handling an incoming call to one of the mobile terminals that is under the control of the mobile base station, comprising the steps of:

making the network retrieve from a home memory information about the mobile base station that is controlling the mobile terminal to be called;

making the mobile base station transfer the call from the network to the mobile terminal;

making the mobile base station receive a radio receiving condition report from the mobile terminal and temporarily hold the report;

making the mobile base station set a channel to a proper one of the existing base stations according to a radio receiving condition report of its own;

making the mobile base station connect the set channel with a channel to be set to the mobile terminal according to the temporarily held report; and processing the incoming call between the mobile terminal and the network.

22. In a method of controlling communication among a network, existing base stations each for controlling a fixed radio zone that covers a predetermined area, a mobile base station for controlling at least one mobile radio zone allocated to an inner space of a mobile object, and mobile terminals, a method of registering the position of one of the mobile terminals that enters into the mobile radio zone from one of the fixed radio zones, comprising the steps of:

making the mobile terminal receive a report and actively issue, according to the report, a request for updating a registered position, the request accompanying information about the mobile base station;

making the mobile base station receive the request and transfer the same to the network through the existing base station that controls the fixed radio zone in question; and making the network receive the request and update the registered position of the mobile terminal stored in a home memory by the information about the mobile base station; and in the method of controlling communication, a method of handling an outgoing call from one of the mobile terminals that is under the control of the mobile base station, comprising the steps of:

making the mobile terminal transmit a radio transmitting condition report to the mobile base station;

making the mobile base station temporarily hold the report and transmit its own radio transmitting condition report to the network through a proper one of the existing base stations;

making the mobile base station set a channel to the existing base station according to a request from the network;

making the mobile base station connect the set channel with a channel to be set to the mobile terminal according to the temporarily held report; and processing the outgoing call between the mobile terminal and the network.

23. In a method of controlling communication among a network, existing base stations each for controlling a fixed radio zone that covers a predetermined area, a mobile base station for controlling at least one mobile radio zone allocated to an inner space of a mobile object, and mobile terminals, a method of registering the position of one of the mobile terminals that enters into the mobile radio zone from one of the fixed radio zones, comprising the steps of:

making the mobile terminal receive a report and actively issue, according to the report, a request for updating a registered position, the request accompanying information about the mobile base station;

making the mobile base station receive the request and transfer the same to the network through the existing base station that controls the fixed radio zone in question; and making the network receive the request and update the registered position of the mobile terminal stored in a home memory by the information about the mobile base station; and in the method of controlling communication, a method of registering the position of one of the mobile terminals in the mobile base station, comprising the steps of:

making the mobile terminal receive reports from the mobile radio zones and actively issue, according to the reports, a request for updating a registered position; and making the mobile base station receive the request and update the registered position managed by the mobile base station.

24. In a method of controlling communication among a network, existing base stations each for controlling a fixed radio zone that covers a predetermined area, a mobile base station for controlling at least one mobile radio zone allocated to an inner space of a mobile object, and mobile terminals, a method of registering the position of one of the mobile terminals that enters into the mobile radio zone from one of the fixed radio zones, comprising the steps of:

making the mobile terminal receive a report and actively issue, according to the report, a request for updating a registered position, the request accompanying information about the mobile base station;

making the mobile base station receive the request and transfer the same to the network through the existing base station that controls the fixed radio zone in question; and making the network receive the request and update the registered position of the mobile terminal stored in a home memory by the information about the mobile base station; and in the method of controlling communication, a method of controlling a channel from the mobile base station to one of the mobile terminals, comprising the steps of:

making the mobile terminal issue a request for switching a channel, the request accompanying a radio condition report about the radio conditions of the mobile radio zones; and making the mobile base station receive the request and set a channel to the mobile terminal in one of the mobile radio zones whose radio condition is determined to be the most suitable according to the radio condition report.

25. In a method of controlling communication among a network, existing base stations each for controlling a fixed radio zone that covers a predetermined area, a mobile base station for controlling at least one mobile radio zone allocated to an inner space of a mobile object, and mobile terminals, a method of registering the position of one of the mobile terminals that enters into the mobile radio zone from one of the fixed radio zones, comprising the steps of:

making the mobile terminal receive a report and actively issue, according to the report, a request for updating a registered position, the request accompanying information about the mobile base station;

making the mobile base station receive the request and transfer the same to the network through the existing base station that controls the fixed radio zone in question; and making the network receive the request and update the registered position of the mobile terminal stored in a home memory by the information about the mobile base station; and in the method of controlling communication, a method of terminating a call of one of the mobile terminals under the control of the mobile base station, comprising the steps of:

cutting a channel between a corresponding one of the existing base stations and the mobile base station according to a channel cutting instruction from the network; and making the mobile base station cut a channel to the mobile terminal.

26. The call terminating method of claim 25, further comprising the step of:

making the mobile base station cut the channel to the mobile terminal upon detecting a squelch between the existing base station and the mobile base station.

27. The call terminating method of claim 25, further comprising the step of:

making the mobile base station cut the channel to the existing base station upon detecting a squelch between the mobile base station and the mobile terminal.

28. In a method of controlling services provided by a mobile base station to mobile terminals, the mobile base station being installed in a mobile object to communicate with existing base stations each controlling a fixed radio zone that covers a predetermined area, as well as with the mobile terminals, the mobile base station controlling at least one mobile radio zone allocated to an inner space of the mobile object, the mobile terminals being present in the mobile radio zone, a method of providing the services to the mobile terminals through speech channels comprising the steps of:

receiving an instruction from any one of the mobile terminals in the mobile radio zone, the instruction being generated with a special dial number, voice, or data; and providing a service corresponding to the instruction to the mobile terminal through a speech channel.

29. In the method of controlling services of claim 28, a method of providing the services to the mobile terminals through control channels comprising the step of:

adding the services to a report and transmitting them to the mobile terminals through the control channels.

30. The method of claim 29, wherein the services include speech rejecting data to release incoming calls to the mobile terminals.

31. The method of claim 29, wherein the services include speech restricting data to release outgoing calls from the mobile terminals.

32. In the method of controlling services of claim 28, a method of providing the services to the mobile terminals through speech and control channels comprising the steps of:

receiving an instruction from any one of the mobile terminals in the mobile radio zone, the instruction being generated with a special dial number, voice, or data; and adding a service corresponding to the instruction to a report and transmitting them to the mobile terminal through a control channel.

* * * * *